(12) United States Patent
Campbell et al.

(10) Patent No.: US 6,168,914 B1
(45) Date of Patent: *Jan. 2, 2001

(54) SYSTEM AND METHOD FOR SOLID-PHASE PARALLEL SYNTHESIS OF A COMBINATORIAL COLLECTION OF COMPOUNDS

(75) Inventors: David A. Campbell, Woodbridge, CT (US); Valery V. Antonenko, Cupertino, CA (US); Harold E. Selick, Belmont, CA (US); Robert M. Gavin, San Jose, CA (US); Satoru Ida, Sunnyvale, CA (US); Arthur H. Muir, Irvine, CA (US)

(73) Assignee: Glaxo Wellcome Inc., Research Triangle Park, NC (US)

( * ) Notice: Under 35 U.S.C. 154(b), the term of this patent shall be extended for 0 days.

This patent is subject to a terminal disclaimer.

(21) Appl. No.: 09/216,093

(22) Filed: Dec. 18, 1998

Related U.S. Application Data

(63) Continuation-in-part of application No. 08/994,802, filed on Dec. 19, 1997, now Pat. No. 6,083,682.

(51) Int. Cl.[7] .............................. C12O 1/00; G01N 1/00; B01J 8/00; B01J 8/04
(52) U.S. Cl. .................................. 435/4; 435/6; 435/7.1; 436/174; 422/130; 422/131; 422/132; 422/134; 422/187; 422/188; 422/193; 422/196
(58) Field of Search ..................................... 422/130, 131, 422/132, 134, 187, 188, 193, 196; 435/4, 6, 7.1, DIG. 44, DIG. 49; 436/174

(56) References Cited

U.S. PATENT DOCUMENTS

| | | |
|---|---|---|
| 4,111,754 | 9/1978 | Park . |
| 4,493,815 | 1/1985 | Ferwood et al. . |
| 4,526,690 | 7/1985 | Kiovsky et al. . |
| 4,598,049 | 7/1986 | Zelinka et al. . |

(List continued on next page.)

FOREIGN PATENT DOCUMENTS

| | | |
|---|---|---|
| 1304916 | 7/1992 | (CA) . |
| 19602464 | 7/1997 | (DE) . |
| 0 403 679 | 12/1990 | (EP) . |
| 1 509 826 | 5/1978 | (GB) . |
| WO90/02605 | 3/1990 | (WO) . |

(List continued on next page.)

OTHER PUBLICATIONS

Baiga (1998), "Integrated Instrumentation for High–Throughput Organic Synthesis," Presented at Cambridge Healthtech Institute's Third Annual Symposium "High–Throughput Organic Synthesis", Mar. 5–6, Coronodo, California.

(List continued on next page.)

Primary Examiner—Jyothsan Venkat
Assistant Examiner—Joseph W. Ricigliano
(74) Attorney, Agent, or Firm—Darin J. Gibby; Lauren L. Stevens

(57) ABSTRACT

The invention provides a system and method for synthesizing chemicals onto supports in a parallel manner to produce a combinatorial collection of compounds. The system includes a plurality of middle plates, with each middle plate defining a plurality of reaction zones arranged in a two dimensional array. The reaction zones are adapted to receive a solid support, such as a sheet of membrane, and the middle plates are stackable on each other to form a three dimensional array of reaction zones. The system also includes a pair of end plates, where the middle plates are located between the end plates, and where the end plates include an array of fluid guides corresponding to the array of reaction zones, to allow for selective routing of reagents through the reaction zones.

23 Claims, 21 Drawing Sheets

U.S. PATENT DOCUMENTS

| | | |
|---|---|---|
| 4,894,343 | 1/1990 | Tanaka et al. . |
| 4,948,442 | 8/1990 | Manns . |
| 5,047,215 | 9/1991 | Manns . |
| 5,108,704 | 4/1992 | Bowers et al. . |
| 5,147,608 | 9/1992 | Hudson et al. . |
| 5,183,744 | 2/1993 | Kawamura et al. . |
| 5,186,844 | 2/1993 | Burd et al. . |
| 5,219,528 | 6/1993 | Clark . |
| 5,272,081 | 12/1993 | Weinreb et al. . |
| 5,273,718 | 12/1993 | Sköld et al. . |
| 5,288,464 | 2/1994 | Nokihara . |
| 5,308,757 | 5/1994 | Kawamura et al. . |
| 5,324,483 | 6/1994 | Cody et al. . |
| 5,384,261 | 1/1995 | Winkler et al. . |
| 5,457,527 | 10/1995 | Manns et al. . |
| 5,472,672 | 12/1995 | Brennan . |
| 5,503,805 | 4/1996 | Sugarman et al. . |
| 5,506,141 | 4/1996 | Weinreb et al. . |
| 5,516,491 | 5/1996 | Kath et al. . |
| 5,529,756 | 6/1996 | Brennan . |
| 5,565,324 | 10/1996 | Still et al. . |
| 5,585,275 | 12/1996 | Hudson et al. . |
| 5,599,688 | 2/1997 | Grass . |
| 5,604,130 | 2/1997 | Warner et al. . |
| 5,609,826 | 3/1997 | Cargill et al. . |
| 5,620,894 | 4/1997 | Barger et al. . |
| 5,622,699 | 4/1997 | Ruoslahti et al. . |
| 5,639,428 | 6/1997 | Cottingham . |
| 5,650,489 | 7/1997 | Lam et al. . |
| 5,665,975 | 9/1997 | Kedar . |
| 5,677,195 | * 10/1997 | Winkler et al. . |
| 5,688,696 | 11/1997 | Lebl . |
| 5,712,171 | 1/1998 | Zambias et al. . |
| 5,725,831 | 3/1998 | Reichler et al. . |
| 5,770,157 | 6/1998 | Cargill et al. . |
| 5,792,430 | * 8/1998 | Hamper . |
| 5,792,431 | * 8/1998 | Moore et al. . |
| 5,798,035 | * 8/1998 | Kirk et al. . |

FOREIGN PATENT DOCUMENTS

| | | |
|---|---|---|
| WO91/07504 | 5/1991 | (WO) . |
| WO92/02303 | 2/1992 | (WO) . |
| WO94/05394 | 3/1994 | (WO) . |
| WO94/06902 | 3/1994 | (WO) . |
| WO94/14972 | 7/1994 | (WO) . |
| WO95/01559 | 1/1995 | (WO) . |
| WO95/11262 | 4/1995 | (WO) . |
| WO96/03212 | 2/1996 | (WO) . |
| WO96/16078 | 5/1996 | (WO) . |
| WO96/30761 | 10/1996 | (WO) . |
| WO96/33010 | 10/1996 | (WO) . |
| WO96/42004 | 12/1996 | (WO) . |
| WO97/06890 | 2/1997 | (WO) . |
| WO97/09353 | 3/1997 | (WO) . |
| WO97/10896 | 3/1997 | (WO) . |
| 0 787 527 | 8/1997 | (WO) . |
| WO97/42216 | 11/1997 | (WO) . |
| WO97/45443 | 12/1997 | (WO) . |
| WO97/45455 | 12/1997 | (WO) . |
| WO98/05424 | 2/1998 | (WO) . |
| WO98/06490 | 2/1998 | (WO) . |
| WO98/08092 | 2/1998 | (WO) . |

OTHER PUBLICATIONS

Baldwin et al. (1995), "Synthesis of a Small Molecule Library Encoded with Molecular Tags," J. Am. Chem. Soc. 117:5588–5589.

Bergot (1998), "Combinatorial Chemistry Workstation to Facilitate Pharmaceutical Development," Presented at Cambridge Healthtech Institute's Third Annual Symposium "High–Throughput Organic Synthesis", Mar. 5–6, Coronodo, California.

Brenner and Lerner (1992), "Encoded combinatorial chemistry," Proc. Natl. Acad. Sci. U.S.A. 89:5381–5383.

Campbell (1998), "Automating Solid–Phase Synthesis without Compromise," Presented at Cambridge Healthtech Institute's Third Annual Symposium "High–Throughput Organic Synthesis," Mar. 5–6, Coronodo, California.

Cargill et al. (1995), "Automated Combinatorial Chemistry on Solid Phase," Proceedings of the International Symposium on laboratory Automation and Robotics 1995. Zymark Corporation, Zymark Center, Hopkinton, MA, pp. 221–234.

Cargill et al. (1996), "Automated Combinatorial Chemistry on Solid Phase," Laboratory Robotics and automation, 8:139–148.

Czarnik, A.W. (1997) No static at all: using radiofrequency memory tubes without (human) interference. Abstract at the Association for Laboratory Automation Labautomation '97 Conference, Jan. 18–22, 1997, San Diego. On the World Wide Web URL http://labautomation.org.

Czarnik and Nova (1997), "No static at all." Chemistry in Britain, Oct., pp. 39–41.

Daniels et al., (1990), "Membranes as novel solid supports for peptide synthesis," Peptides, Proceedings of the Eleventh American Peptide Symposium Jul. 9–14, 1998 (Rivier and Marshall, eds.), pp. 1027–1028.

DeWitt et al. (1996), Combinatorial Organic Synthesis Using Park–Davis "Diversomer Method," Acc. Chem. Res. 29:114–122.

DeWitt et al. (1994), "Diversomer technology: solid phase synthesis, automation, and integration for the generation of chemical diversity," Drug Dev. Res. 33:116–124.

DeWitt et al. (1996), "A modular System for combinatorial and Automated Synthesis" in "Molecular Diversity and Combinatorial Chemistry: Libraries and Drug Discovery. ACS Conference Proceedings Series" (Chaiken and Janda Eds.) pp. 207–218. American Chemical Society, Washington D.C.

DeWitt et al. (1995), "Automated synthesis and combinatorial chemistry," current Opinion in Biotechnology 6:640–645.

DeWitt et al. (1993), "Diversomers": An approach to non-peptide, nonoligomeric chemical diversity. Proc. Natl. Acad. Sci. U.S.A. 90:6909–6913.

Floyd et al. (1997), "The Automated Synthesis of Organic Compounds—some Newcomers Have Some Success" in "Proceedings of the International Symposium on Laboratory Automation and Robotics 1996" pp. 51–76. Zymark Corporation, Zymark Center, Hopkinton, MA.

Frank et al. (1988), "Simultaneous multiple peptide synthesis under continuous flow conditions on cellulose paper discs as segmental solid supports," Tetrahedron 44:6031–6040.

Frank (1994), "Spot–synthesis: An easy and flexible tool to study molecular recognition," Innovation and Perspectives in Solid Phase Synthesis, (Epton, ed.), pp. 509–512.

Furka et al. (1991), "General method for rapid synthesis of multicomponent peptide mixtures," Int. J. Pept. Protein Res. 37:487–493.

Gooding et al. (1996), "Boosting the Productivity of Medicinal Chemistry Through Automation Tools, Novel Technological Developments Enable a Wide Range of Automated Synthetic Procedures" in "Molecular Diversity and Combinatorial chemistry: Libraries and Drug Discovery. ACS Conference Proceedings Series" (Chaiken et al.) pp. 199–206. American Chemical Society, Washington, D.C.

Harness (1996), "Automation of High–Throughput Synthesis. Automated Laboratory Workstations Designed to Perform and Support Combinatorial Chemistry" in "Molecular Diversity and Combinatorial Chemistry: Libraries and Drug Discovery. ACS Conference Proceedings Series" (Chaiken et al.) pp. 188–198. American Chemical Society, Washington, D.C.

Kerr et al. (1993), "Encoded combinatorial peptide libraries containing non–natural amino acids," J. Am. Chem. Soc. 115:2529–2531.

Lam et al. (1991), "A new type of synthetic peptide library for identifying ligand–binding activity," Nature (London), 354:82–84.

Lashkari et al. (1995), "An automated multiplex oligonucleotide synthesizer: Development of high–throughput, low–cost DNA synthesis," Proc. Natl. Acad. Sci. USA 92:7912–7915.

Lebl et al. (1995), "One–bead–one–structure combinatorial libraries," Biopolymers, 37:177–198.

Meyers et al. (1996), "Versatile method for parallel synthesis," Methods Mol. Cell. Biol. (1996), 6:67–73.

Meyers et al., "Multiple simultaneous synthesis of phenolic libraries," ESCOM Science Publishers B.V., Leiden, The Netherlands, Copyright 1995, Mol. Diversity, 1:13–20.

Mjalli (1997), "Application of Automated Parallel Synthesis" in "A Practical Guide to Combinatorial Chemistry" (Czarnik et al.) pp. 327–354. American Chemical Society, Washington, D.C.

Moran et al. (1995), "Radio Frequency Tag Encoded Combinatorial Library Method for the Discovery of Tripeptide–Substituted Cinnamic Acid Inhibitors of the Protein Tyrosine Phosphatase PTP1B," J. Am. Chem. Soc. 117:10787–10788.

Nakazawa (1994), "Chapter 20. The anisotropic principle," in Principles of Precision Engineering, Oxford University Press, pp. 212–228.

Nestler et al. (1994), "A General Method for Molecular Taggin of Encoded Combinatorial Chemistry Libraries," J. Org. Chem. 59:4723–4724.

Ni et al. (1996), "Versatile Approach to Encoding combinatorial Organic Syntheses Using Chemically Robust Secondary Amine Tags," J. Med. Chem. 39:1601–1608.

Nicolau et al. (1995), "Radiofrequency encoded combinatorial chemistry," Angew. Chem. Int. Ed. 34:2289–2291.

Nielsen et al. (1993), "Synthetic methods for the implementation of encoded combinatorial chemistry," J. Am. Chem. Soc. 115:9812–9813.

Nikolaev et al. (1993), "Peptide–encoding for structure determination of nonsequenceable polymers within libraries synthesized and tested on solid–phase supports," Pept. Res. 6:161–170.

Ohlmeyer et al. (1993), "Complex synthetic chemical libraries indexed with molecular tags," Proc. Natl. Acad. Sci. U.S.A. 90:10922–10926.

Porco et al. (1998), "Automated chemical synthesis: chemistry development on the Nautilus 2400TM," Drugs of the Future 23:71–78.

Powers et al. (1998), "Personal Synthesizer for HTS," Genetic Eng. News, 18, No. 3, p. 14.

Rivero et al. (1997), "Equipment for the High–Throughput Organic Synthesis of Chemical Libraries" in "A Practical Guide to combinatorial chemistry" (Czarnik et al.) pp. 281–307. American Chemical Society, Washington, D.C.

Salmon et al. (1993), "Discovery of biologically active peptides in random libraries: solution–phase testing after staged orthogonal release from resin beads," Proc. Natl. Acad. Sci. U.S.A. 90:11708–11712.

Stanchfield (1997), "FlexChemTM: A Modular System for High Throughput Synthesis of Small Molecules," Robbins Innovations, 5, No. 4, pp. 1–6.

Stanchfield (1998), "A Flexible, Modular System for Performing High–Throughput Synthesis of Small Molecules," Presented at Cambridge Healthtech Institute's Third Annual Symposium "High–Throughput Organic Synthesis", Mar. 5–6, Coronodo, California.

Terrett et al. (1997), "Drug discovery by combinatorial chemistry—The development of a novel method for the rapid synthesis of single compounds," Chem. Eur. J. 3:1917–1920.

Veldkamp and McHugh (May 1992), "Binary Optics," Scientific American, pp. 92–97.

Whitten et al. (1996), "Rapid Microscale Synthesis, a New Method for Leading optimization Using Robotics and Solution Phase Chemistry: Application to the Synthesis and Optimization of Corticotropin–Releasing Factor Receptor Antagonists," J. Med. Chem. 39:4354–4357.

* cited by examiner

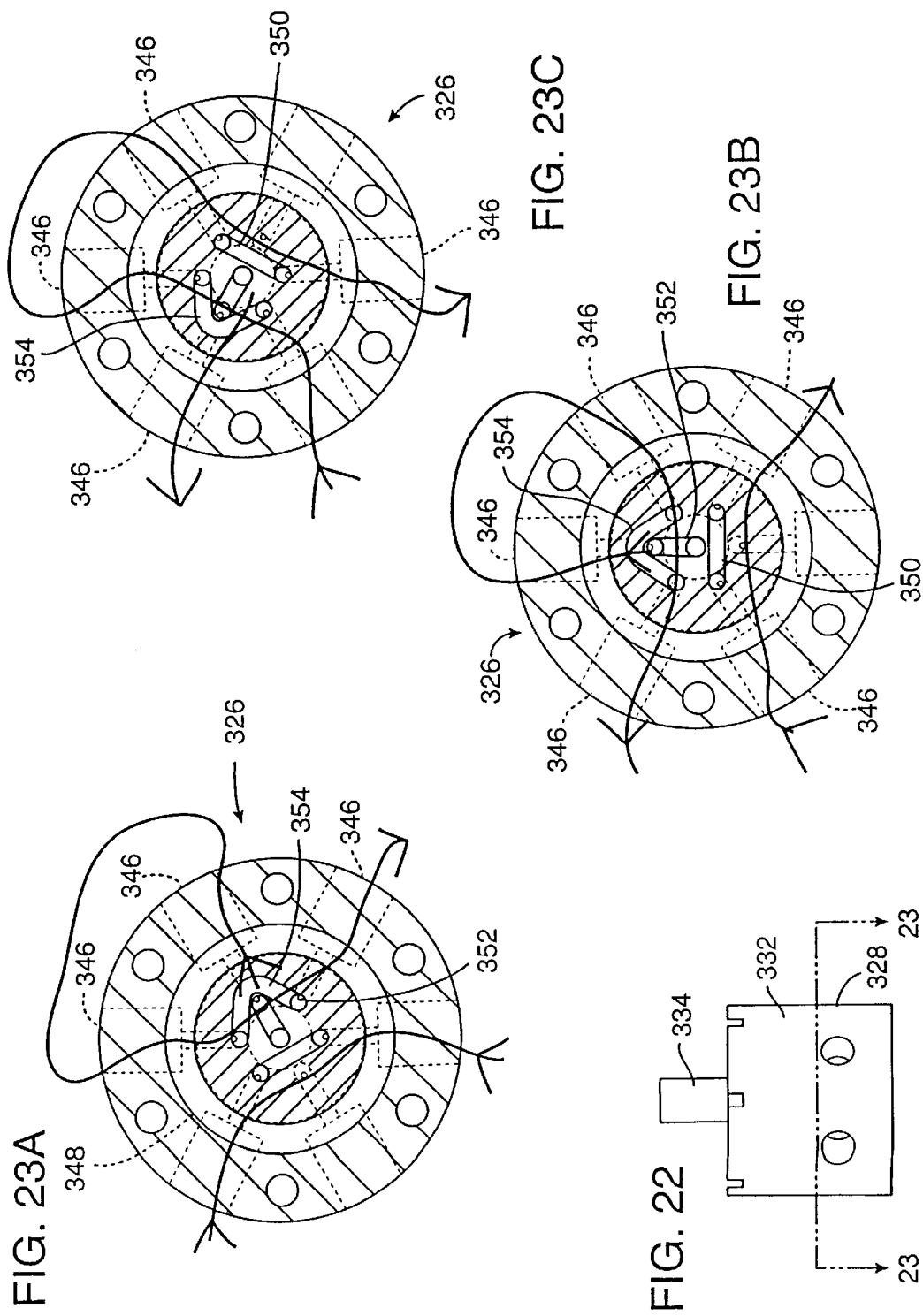

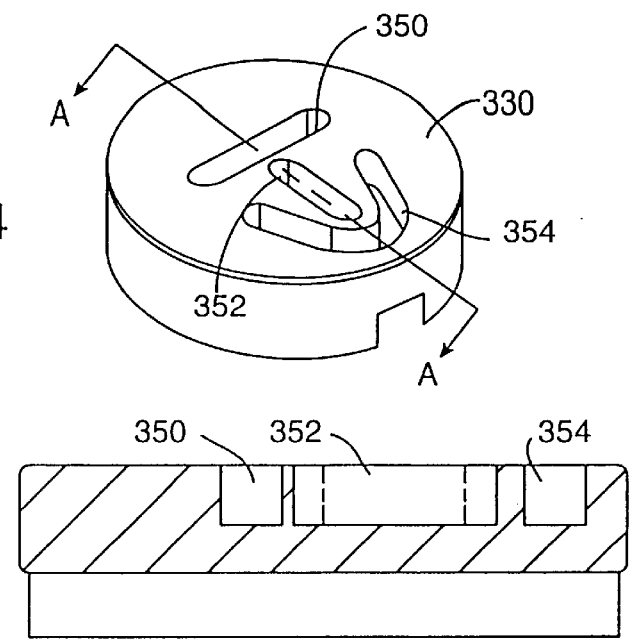
FIG. 24
FIG. 24A
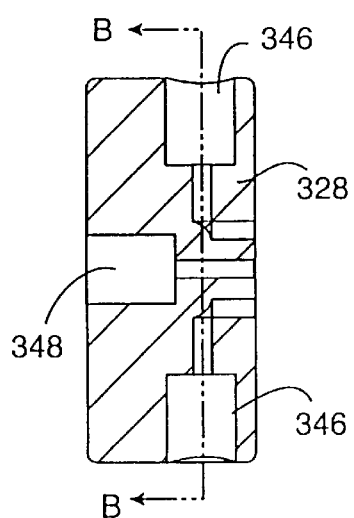
FIG. 25A
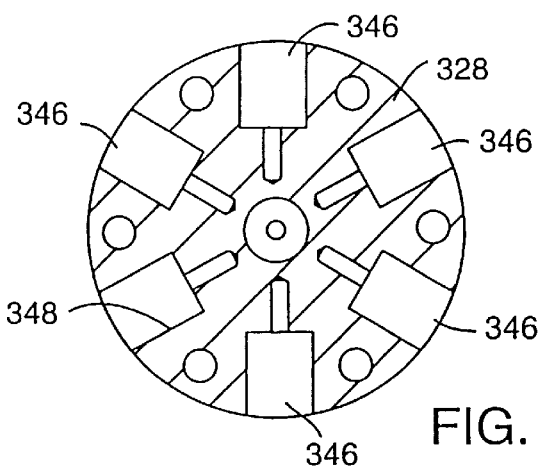
FIG. 25B
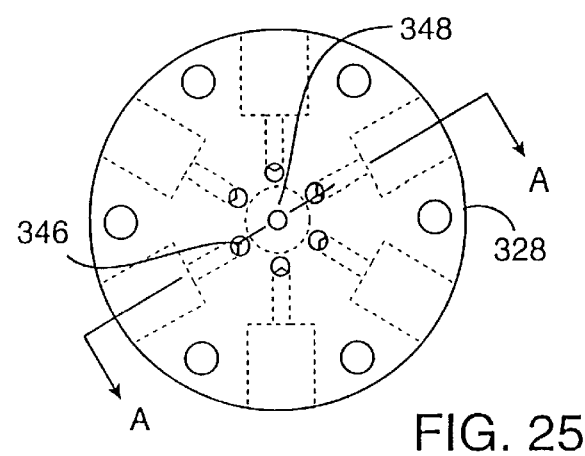
FIG. 25

SYSTEM AND METHOD FOR SOLID-PHASE PARALLEL SYNTHESIS OF A COMBINATORIAL COLLECTION OF COMPOUNDS

CROSS REFERENCE TO RELATED APPLICATIONS

This application is a continuation in part application of U.S. patent application Ser. No. 08/994,802, filed Dec. 19, 1997, now U.S. Pat. No. 6,083,682, the complete disclosure of which is herein incorporated by reference.

FIELD OF THE INVENTION

The invention relates generally to the field of chemical synthesis, and in particular to the synthesis of various chemicals onto supports in a parallel manner to produce a combinatorial collection of compounds.

REFERENCES

Barany et al., *J. Am. Chem. Soc.* 107: 4936 (1985).

Beebe X. et al., *J. Am. Chem. Soc.* 114:10061 (1992).

Bellof and Mutter *Chimia* 39:10 (1985).

Bunin, B. A. and Ellman, J. A., *J. Am. Chem. Soc.* 114:10997 (1992).

Bunin, B. A. et al., *Proc. Natl. Acad. Sci. U.S.A.* 91:4708 (1994).

Daniels, S. B. et al., *Pept. Chem., Struct. Biol., Proc. Am. Pept. Symp.*, 11th:1027–8. Rivier, J. E. and Marshall, G. R., eds. ESCOM Sci. Pub., Leiden, Neth. (1990).

Dower et al., U.S. Pat. No. 5,639,603, issued Jun. 17, 1997.

*Solid Phase Synthesis—Peptides, Proteins and Nucleic Acids; Biological and Biomedical Applications.* Roger Epton, Ed., Mayflower Worldwide Limited, Birmingham, England, UK, 1994.

Früchtel, J. S. and Jung, G., *Agnew. Chem.* 35:17–41 (1996).

Gallop, M. A. et al., *J. Med Chem.* 37:1233 (1994).

Gallop et al., U.S. Pat. Ser. No. 5,525,734, Issued Jun. 11, 1996.

Geysen et al., International Publication Number WO 90/09395.

Gordon, D. W. and Steele, J., *Bioorg. Med. Chem. Lett.* 5:47 (1995).

Gordon, E. M. et al, *J. Med. Chem.* 37:1385 (1994).

Hobbs DeWitt, S. et al., *Proc. Natl. Acad. Sci. U.S.A.* 90:6909 (1993).

Holmes, C. P. et al., *J. Org. Chem.* 60:7328 (1995).

Holmes, C. P., U.S. Pat. Ser. No. 5,549,974, Issued Aug. 27, 1996.

Lloyd-Williams, P. et al., *Tetrahedron* (1993) 49:11065

Maclean, D. et al., *Proc. Natl. Acad. Sci. U.S.A.* 94:2805 (1997).

Moon, H.-S. et al., *J. Org. Chem.* 57:6088 (1992).

Murphy, M. M. et al.,*J. Am. Chem. Soc.* 117:7029 (1995).

Patek, M. et al., *Tetrahedron Lett.* 36:2227 (1995).

Patel, D. V., and Gordon, E. M., *Drug Disc. Today* 4:134–144 (1996).

Pei, Y. and Moos, W. H., *Tetrahedron Lett.* 35:5825 (1994).

Plunkett, M. J. and Ellman, J. A., *J. Am. Chem. Soc.* 117:3306 (1995).

Szardenings, A. K. et al., *Tetrahedron* 53:6573 (1997).

Thompson, L. A. and Ellman, J. A., *Chem. Rev.* 96:555–600 (1996).

BACKGROUND OF THE INVENTION

Large collections (libraries) of organic molecules have emerged as important tools for the successful identification of useful compounds. Such libraries have typically been synthesized using combinatorial approaches (see, e.g., Gallop et al., 1994; Gordon, E. M. et al., 1994). Several different methods have been used to assemble combinatorial libraries of various compounds. One such methodology was disclosed in Geysen, et al. Geysen's method involves functionalizing the termini of polymeric rods and sequentially immersing the termini in solutions of individual amino acids. A second method of peptide or oligonucleotide synthesis was developed by Affymax Technologies N.V. and disclosed in U.S. Pat. No. 5,143,854. The Affymax method involves sequentially using light for illuminating a plurality of polymer sequences on a substrate and delivering reaction fluids to said substrate. This method of synthesis produces large numbers, but relatively small quantities of products. A further method and device for producing peptides or oligonucleotides is disclosed in Houghton, E.P.O. 196174. Houghton's apparatus is a polypropylene mesh container or sac, similar to a tea-bag, which encloses reactive particles.

While combinatorial chemistry synthetic schemes such as the methods described above can generate large numbers of different compounds with a minimum number of steps, they have certain disadvantages. As mentioned above, some of the methods are capable of producing only limited quantities of each compound. Furthermore, the compounds are typically synthesized and screened in "pools" or "batches." This can result in loss of potentially valuable information during screening if, for example, a particular pool contains compounds which possess both agonist and antagonist activities. Further, once a pool is identified as containing a potentially active compound, the identity of the active compound must be determined, This identification or decoding requires some type of deconvolution or tagging protocol, requiring additional steps to identify the active compound.

Parallel synthesis strategies do not suffer from the above-mentioned disadvantages of combinatorial approaches, as a single compound is generated and assayed (see, e.g., Sugarman et al., U.S. Pat. No. 5,503,805, issued Apr. 2, 1996). The disadvantage of parallel synthesis strategies is that presently-available instrumentation for carrying out such syntheses is costly and complex, requiring a large number of valves, separate pieces of tubing, and the like. Accordingly, it is generally not suitable for the synthesis of large numbers (e.g., >100) of compounds. Currently available parallel synthesis instruments are typically limited in their capacity to between 12 and 24 reaction vessels for automated instruments and 96 reaction vessels for manual instruments.

Thus, there is a need for a simple and efficient systems and methods for synthesizing large numbers of compounds, that do not suffer from the above disadvantages of combinatorial approaches or the complexity and limitations of currently-available parallel synthetic approaches. The present invention provides such a method.

SUMMARY OF THE INVENTION

The invention provides, in one aspect, a system for synthesizing chemicals onto membrane supports in a parallel manner. The system includes a plurality of middle plates and a pair of end plates. Each middle plate has a plurality of holes arranged in a two dimensional array, e.g., square or rectangular array, having x and y axes. The middle plates are stackable on each other and adapted to receive interleaving sheets of membrane to form a three dimensional array of reaction zones having x, y and z axes and defining Z (x,y) reaction planes. Alternatively, the holes in the middles plates may be defined by wells or reaction vessels for holding solid supports, such as beads. In such a three dimensional array, reaction zones having common (x,y) coordinates and different z coordinates form a "column" of reaction zones.

The middle plates may be formed of any material that is resistant to the reagents, building blocks and/or solvents which will be circulated through the device. Preferably, the middle plates are constructed on a non-compliant material, such as stainless steel, with one particular embodiment employing 0.005 inch thick 316 stainless steel. Alternatively, the middle plates may be formed of a material that is somewhat compliant, so that when the middle plates are clamped together about a membrane, a fluid-tight seal is achieved between adjacent reaction zones in the same (x,y) plane. Other exemplary materials suitable for use as middle plates with the present invention include polytetrafluoroethylene (PTFE) or "KALREZ" sheets. The sheets typically have a thickness of between about 0.002" and 0.2"; preferably between about 0.003" and 0.05", and more preferably from about 0.005" and 0.01".

The membranes may be interleaved such that each sheet of membrane is flanked by a set or pair of middle plates, such that a stack of middle plates and membranes would contain, in sequence, a middle plate, membrane, middle plate, middle plate, membrane, middle plate, middle plate, membrane, etc. Further, several sheets of membranes may be interposed in between a single pair of middle plates, thus increasing the surface area available for chemical synthesis of a compound at each reaction zone. The membranes may be formed of, e.g., polypropylene, polyethylene, polytetrafluoroethylene (PTFE) polyacrylate terpolymer, PTFE polyacrylamide terpolymer, or fluoropolymer membrane grafted with styrene, acrylate, or acrylamide. Alternatively, the middle plates may be used to define wells or reaction vessels for holding other types of solids supports, such as beads.

A pair of end plates is also provided, and the middle plates are positioned between the end plates. The end plates include fluid guides, such as fittings, cylindrical members, channels and/or other plumbing, to selectively route various reagents, chemical or building blocks through the reaction zones or vessels.

The middle plates are preferably rotatable relative to the end plates to allow the fluid guides to be aligned with selected columns or planes of reaction zones. In one aspect, the fluid lines in one of the end plates are formed into an array of manifolds to allow each manifold to be aligned with one group of reaction zones when the end plate is in a first orientation and to be aligned with another group of reaction zones when the end plate is in a second orientation. Further each manifold array is preferably connectable to a reagent source, such as a reagent vessel. In one embodiment, the fluid guides are arranged to circulate a reagent or building block through adjacent columns of reaction zones. The fluid guides may further each include a narrowing orifice to control the flow of chemicals through the fluid lines.

The system may further comprise a reagent vessel, a transfer means connecting a subset of the fluid guides with the reagent vessel, and/or a delivery means for delivering fluid from the reagent vessel to the reaction zones as described in more detail below. In one general embodiment, the system includes a compression means effective to compress the end plates together with sufficient force to isolate reaction zones in each other (x,y) reaction plane from one another by a fluid-tight seal. Examples of devices which can be used to compress the middle plates include a pneumatic press, a hydraulic press, a clamp, and a set of bolts.

In another aspect, the invention provides a method for synthesizing a library of compounds. The method includes the steps of (i) providing a pair of middle plates, each middle plate containing a plurality of holes arranged in a two dimensional array having x and y axes when the plates are aligned with one another; (ii) interposing, between the plates, a sheet of membrane capable of serving as a solid support for chemical synthesis; (iii) compressing the plates together to form an array of discrete reaction zones corresponding to the array of holes, where each reaction zone contains a portion of the sheet of membrane and where the compressing creates a fluid-tight seal between adjacent reaction zones; (iv) delivering a second building block to the reaction zones such that zones having a common x coordinate value receive the same second building block; and (v) delivering a third building block to the reaction zones such that zones having a common y coordinate value are contacted with the same third building block. The reaction of the second and third building blocks in the different reaction zones thus forms the library of compounds. In one general embodiment, the sheet of membrane is pre-derivatized with a first building block, and the library of compounds is formed by the reaction of the first, second and third building blocks in the different reaction zones. The membrane may be any membrane suitable for performing chemical syntheses, as described above.

The middle plates and membranes may be arranged to form a stack, flanked by a pair of end plates, which may include an array of fluid guides corresponding to the array of reaction zones, to allow for selective routing of reagents through the reaction zones. The compressing step may then be accomplished by compressing or clamping the end plates together, for example, with a pneumatic or hydraulic press, or using a clamp or set of bolts.

The invention also provides another exemplary method for preparing a combinatorial library of compounds. According to the method, a plurality of reaction zones is provided. The number of reaction zones is preferably represented as (X×Y×Z), which notation represents the product of X, Y, and Z, where X, Y, and Z represent integers. For example, if X=2, Y=3 and Z=4, (X×Y×Z) would be equal to 24. The reaction zones are preferably arranged in a three dimensional array having x, y and z axes. Accordingly, if the same numbers are used, the array of 24 reaction zones has the dimensions of 2 zones along the x axis, 3 zones along the y axis, and 4 zones along the z axis. The location of each zone in the array is defined by its (x,y,z) coordinates in the array, e.g., a particular zone may have the coordinates (1,3,2). It follows that 2-dimensional planes or arrays of zones may be defined by holding one of the coordinate values constant, e.g., a (y,z) reaction plane of reaction zones is defined by a common x coordinate value. Each of the zones in the array comprises a solid support formed of a portion of a sheet of membrane, and each sheet of membrane provides support for a plurality of zones which have common z coordinates and which are isolated from one another by fluid-tight seals. Alternatively, the solid supports may comprise beads which are held within each reaction zone. In an exemplary embodiment, the solid supports for all zones having a common z coordinate value are contained are on single sheet of membrane (or co-extensive overlapping multiple sheets). The membranes are preferably derivatized with reaction groups as described above.

In preferred embodiments, each solid support has a first building block derivatized thereto, and all zones having a common z coordinate value contain supports with the same first building block. In one embodiment, Z different first building blocks are used, and supports in all zones having a particular z coordinate value are derivatized with a first building block that is different from the first building block attached to supports in zones having different z coordinate values. For instance, the first building block can be a scaffold or portion of a scaffold for a small-molecule library having 3 variable positions or points of diversity. By way of example, in a synthesis where Z=2, the first building block at z=1 is the scaffold with group "A" at one of the points of diversity, and the first building block at z=2 is the scaffold with group "B" at the point of diversity. The other 2 points of diversity on each of the scaffolds may then be derivatized with one of a set of second building blocks, and one of a set of third building blocks, respectively, as described below.

The method further includes contacting a second building block with the support in each of the zones, such that supports in all zones having a common x coordinate value, i.e., all zones in a particular (y,z) plane, are contacted with the same second building block. The contacting is done under chemical synthesis conditions effective to form an intermediate product containing the first and second building blocks (or those portions of the first and second building blocks that remain following the chemical reaction used to link the building blocks to one another). Such chemical synthesis conditions are known in the art of solid-phase chemical synthesis. In one embodiment, X different second building blocks are used, and supports in all zones having a particular x coordinate value are contacted with a second building block that is different from the second building blocks contacted with supports in zones having different x coordinate values. This second building block may be, for example, a group designated for attachment to another variable position or point of diversity on the scaffold described above. The X different second building blocks are typically stored in X different reagent vessels, respectively, and are introduced to the zones through manifolds, typically X different manifolds, operably connected to the X reagent vessels, respectively.

A third building block is then contacted with the support in each of the zones, such that supports in all zones having a common y coordinate value are contacted with the same third building block. As above, the third building block is contacted under conditions effective to form a compound from the intermediate product and the third building block. The third building block may be introduced as described above for the second building blocks, e.g., using Y different third building blocks, Y different reagent vessels, manifolds and the like. Carrying out the above-described steps thus results in the synthesis of a combinatorial library of compounds.

The method may be practiced using an array of manifolds. The manifolds are preferably (i) aligned with zones having a common x coordinate value when the manifolds are in a first orientation, and (ii) aligned with zones having a common y coordinate value when the manifolds are in a second orientation. To move the array from one orientation to the other, the array is typically rotated by 90 degrees relative to the reaction zones, so that if the manifolds had been aligned with (y,z) planes in the first orientation, they would be aligned with (x,z) planes in the second orientation.

To allow for convenient introduction of reagents to the reaction zones, the 3-dimensional array of reaction zones is preferably flanked along the z axis by a pair of end plates, each of which includes plumbing designed to allow the building blocks to flow through the reaction zones. In one embodiment, the plumbing comprises channels in the plates effective to (i) circulate the same first building block through each zone having a common x coordinate value when the end plates are in a first orientation, and (ii) circulate the same second building block through each zone having a common y coordinate value when the end plates are in a second orientation. Each end plate may in turn be formed of more than one component, e.g., a clamping plate and a manifold plate. Efficient circulation of reagents, building blocks and the like may be enhanced by piercing holes in, or perforating the membranes in the reaction zones. Perforating the membranes reduces the pressure required to circulate reagents through a column of reaction zones, particularly in cases where several layers of membrane comprise the solid support in a single reaction zone.

The reaction zones in the simplest case are simply those portions of the membrane exposed to the various reagents/building blocks. It will be understood that to increase product yield, a region of each of several sheets of membrane may be included in each reaction zone. Different zones in a single (x,y) plane are isolated from one another by a fluid-tight seal. As is appreciated from the foregoing discussion, such a seal may be formed, for example, by including one or more middle plates in the 3-dimensional array of reaction zones to separate sheets of membrane containing planes of reaction zones having a common z coordinate value. The middle plate contains an array of holes spaced to correspond to the spacing of the reaction zones, and the seal may be achieved by applying pressure to the end plates, thereby compressing the membranes between the end plates and any middle plates. The reaction zones in such a configuration are defined by the portions of membrane aligned with the holes of the middle plate. The compression force applied by the end and middle plates on regions of membrane outside the reaction zones effectively seals those regions, thereby separating adjacent reaction zones in a single membrane sheet by fluid-tight seals. Alternatively, the reaction zones may comprise wells or reaction vessels which hold solid supports, such as beads.

Sealing may be facilitated by using middle plates having ridges ("force directors") surrounding the holes on at least one side, to direct the compression force to a ring around each reaction zone. Alternatively or in addition, sealing may be achieved by treating the membrane before it is used in an apparatus or methods of the invention. For example, the membrane may be treated by compressing it under high pressure, optionally at elevated temperatures, in a ring pattern around the regions that will become the reaction zones. Such compression can be used to compact the membrane such that it no longer has pores in the region of compression, and thus loses its ability to wick liquids in that region.

The invention also includes a system for synthesizing a combinatorial library of compounds. The system comprises (X×Y×Z) reaction zones arranged in a three dimensional array having x, y and z axes and forming X (y,z), Y (x,z) and Z (x,y) reaction planes. The location of each zone in the array is defined by its (x,y,z) coordinates, each of the zones comprises a solid support formed of a portion of a sheet of membrane, each sheet of membrane provides support for a plurality of zones which have common z coordinates and which are isolated from one another by fluid-tight seals, and reaction zones having common (x,y) coordinates are in fluid communication with one another. In one general embodiment, each solid support or portion of membrane has a first building block derivatized thereto. Alternatively, the reaction zones may be configured as reaction vessels which hold solid supports, such as beads, which have the first building block derivatized thereto.

The system further includes at least one reagent source, such as a reagent vessel; a transfer means connecting the reaction zones with the reagent source; and a delivery means for delivering fluid from the reagent source to the reaction zones by way of the transfer means. The reagent vessel may in turn include additional elements, such as a condenser, a plurality of feed lines for delivering reagents to the reagent vessel, a heater, a temperature sensor, and the like.

In one embodiment, the delivery means comprises a pump, such as a peristaltic, diaphragm, metering or syringe pump. Alternatively, the delivery means may comprise pressurized gas introduced into one of a pair of reagent vessels.

In a preferred embodiment, the system employs a closed loop for reagent/building block delivery, so that reagents and building blocks can be circulated or recirculated through the reaction zones. In a preferred embodiment, the reagent source comprises a number of reagent vessels (or pairs of reagent vessels) that is equal to X or Y, whichever is greater.

As discussed above, the system may further comprise a plurality of manifolds, each of which is selectively alignable with one of the (x,z) or (y,z) planes of reaction zones, to allow building blocks from a single reagent source to pass through a selected one of the planes of reaction zones. The manifolds may be fashioned into a 2-dimensional array which is rotatable relative to the 3-dimensional array of reaction zones to align each manifold with either (x,z) reaction zone planes or (y,z) reaction zone planes. Each manifold is preferably linked to its own reagent source. Further, the number of manifolds in the array is typically equal to or greater than X or Y, whichever is greater. In this way, the manifold array can be used to deliver reagents to all X (y,z) reaction planes, as well as to all Y (x,z) reaction planes. For example, if X=8 and Y=12, the number of manifolds would preferably be 12 or more.

In another exemplary embodiment, the invention provides systems and methods for synthesizing a first building block onto a membrane. One such system comprises a flow plate having at least one elongate aperture. A membrane is wrapped around a rod which is then inserted into the aperture of the flow plate. At least one fluid source is then coupled to the aperture to allow a fluid having the first building block to flow through the aperture and to be deposited onto the membrane. Once the first building block has been placed onto the membrane, the rod is removed from the aperture and the membrane is unrolled from the rod where it is ready for placement in the synthesizing systems described herein.

Conveniently, the flow plate may include a plurality of apertures for receiving a plurality of rods. In this way, multiple membranes may have a first building block placed on them at the same time. In one particular aspect, the flow plate may be placed between a top plate and a bottom plate which have openings to transport fluids into and out of the flow plate. Conveniently, the top plates and bottom plates may comprise manifolds which are similar to the manifolds used with the other synthesizing systems described herein. In this way, the flow plate may be substituted for the middle plates of the synthesizer described herein when placing the first building block onto the membrane. Following this procedure, the flow plate is replaced with the middle plates (which include the membranes from the flow plate) and the synthesizing process is continued.

The invention provides an exemplary system for synthesizing a combinatorial library of compounds. The system comprises a plurality of fluid sources which are coupled to a fluid delivery system. A fluid distribution system is coupled to the fluid delivery system to deliver fluid from the fluid delivery system to a plurality of fluid reservoirs. A combinatorial array synthesizer stack is coupled to the fluid reservoirs and has a plurality of reaction zones that are arranged in a three dimensional array. Each reservoir is coupled to a two-dimensional array of reaction zones within the three dimensional array of reaction zones. The system preferably also includes a fluid recirculation system to circulate fluids between the reservoirs and the synthesizer stack. The recirculation system may also be employed to drain and gas dry channels extending through the synthesizer stack. Optionally, a temperature control system may also be provided to control temperatures in the reservoirs and in the synthesizer stack.

The invention further provides an exemplary system for synthesizing a combinatorial library of compounds. The system comprises a plurality of fluid sources that are coupled to a first manifold. A second manifold is provided and is coupled to the first manifold, and a plurality of fluid reservoirs are coupled to the second manifold. The system further includes a combinatorial array synthesizer stack having a plurality of reaction zones arranged in a three dimensional array. Each reservoir is coupled to a two-dimensional array of reaction zones within the three dimensional array of reaction zones. In this manner, any one of the fluids from the fluid sources may be provided to any of the two dimensional array of reaction zones so that a wide variety of compounds may be produced.

The reservoirs are preferably adjustably coupled to the synthesizer stack to allow the reservoirs to be coupled to other two dimensional arrays of reaction zones within the three dimensional array of reaction zones. For example, as described with other embodiments, the synthesizer stack may be rotated ninety degrees to align orthogonal two-dimensional arrays with the fluid reservoirs.

In another particular aspect, the fluid sources are coupled to a pressure source. Further, a valve is disposed between the pressure source and each fluid source. In this way, the valves may be separately operated to supply pressure to the fluid sources to selectively deliver fluids into the first manifold. The pressure source is preferably also coupled to the first manifold to directly supply a pressurized gas to the manifold. Such a gas may be used, for example, to dry the reaction zones following introduction of reagents to the reaction zones.

In still another aspect, the system may include a plurality of combinatorial array synthesizer stacks. A valving system is provided to selectively distribute fluids from the fluid sources to each of the synthesizer stacks. In yet another aspect, a valve is disposed at an end of the second manifold and is placed in an open position to allow fluids to fill the second manifold. A sensor is optionally disposed near the end of the second manifold to sense when the second manifold is filled with the fluid.

In one particularly preferable aspect, a pump is disposed between each reservoir and the synthesizer stack to move fluids from the reservoirs and through the two-dimensional arrays of reaction zones. Preferably, the synthesizer stack has an inlet end and an outlet end, and the reservoirs are coupled to both the inlet end and the outlet end to allow fluids to be circulated through the reaction zones and back to the reservoirs. In one aspect, a check valve is disposed between the outlet end of the synthesizer stack and each reservoir. In this way, fluids may be removed from the system through the check valves upon pressurization of the fluids to a pressure that meets or exceeds a cracking pressure of the check valves. Preferably, a second pressure source is coupled to the reservoirs to increase the pressure of the fluids above the cracking pressure so that the fluids may be drained from the system. Alternatively, diaphragm valves may be employed instead of check valves, with the diaphragm valves preferably being operated with an automated controller.

In yet another particularly preferable aspect, the system includes a plurality of multiple position valves that are disposed between the second manifold and the synthesizer stack. The multiple position valves may be moved to multiple positions to facilitate the delivery of the reagents, washing solvents, drying gases, and the like to the reaction zones. For example, the multiple position valves preferably each have a solvent delivery position where a solvent or reagent from the second manifold passes through the valves and into the reservoirs to fill the reservoirs with solvent. A pump is preferably disposed between each reservoir and the synthesizer stack to move the fluids from the reservoirs and through the two-dimensional arrays of reaction zones. The multiple position valves preferably each have a recirculation position where the solvent in the reservoirs is pumped from the reservoirs by the pumps, through the multiple position valves, through the synthesizing stack, and back into the reservoirs. In this manner, the solvents may be continuously recirculated through the reaction zones.

In another aspect, the multiple position valves each have a washing position where a washing solvent from the second manifold passes through the multiple position valves, through the reservoirs, back through the multiple position valves, through the synthesizing stack, back through the multiple position valves, and out to waste.

In still another aspect, the multiple position valves each have a drying position where a gas from the second manifold passes through the multiple position valves, through the synthesizing stack, back through the multiple position valves and out to waste.

These and other objects and features of the invention will become more fully apparent when the following detailed description is read in conjunction with the accompanying drawings.

BRIEF DESCRIPTION OF THE DRAWINGS

FIG. 22 is a side view of the multiple position valve of FIG. 21.

FIGS. 23A–23C illustrate the multiple position valve of FIG. 22 taken along lines 22—22 and showing various positions in which the valve may be configured according to the invention.

FIG. 24 is a bottom perspective view of a valve rotor of the valve of FIG. 21.

FIG. 24A is a cross-sectional side view of the rotor of FIG. 24 taken along lines A—A.

FIG. 25 is a top view of a valve body of the valve of FIG. 21.

FIG. 25A is a cross-sectional side view of the valve body of FIG. 25 taken along lines A—A.

FIG. 25B is a cross-sectional side view of the valve body of FIG. 25A taken along lines B—B.

DETAILED DESCRIPTION OF THE SPECIFIC EMBODIMENTS

I Definitions

The term "building blocks" refers to the chemical components which are introduced sequentially in a step-by-step manner to generate a desired product or compound. Small molecule compounds suitable for screening for pharmacological activity can typically be synthesized using between 2 and 5 building blocks. To generate a combinatorial library of such compounds, the building blocks are introduced in "sets," where the number of sets is equal to the number of building blocks required to make a final compound. Therefore, to synthesize a combinatorial library of compounds where each compound is synthesized using 3 different building blocks, the methods uses 3 sets of building blocks. The building blocks within each set typically belong to the same "chemical family," so that they will react with building blocks in the other sets in a predictable manner (Gordon et al., 1994). The building blocks may be selected to react in a polymeric fashion to form a linear molecule having a structure specified by the identify of the building block at each position. Alternatively, the building blocks may be selected to react in an interlocking manner, giving rise to non-polymeric three-dimensional structures (Gordon et al., 1994, incorporated herein by reference). The present invention preferably employees 2 or 3 sets of building blocks during a synthesis of a library of compounds.

The term "reaction zone" refers to a volume which is adapted to contain a solid support, such as a membrane, and a reagent solution for reacting with the solid support

II Overview of the Invention

The invention provides systems and methods for synthesizing chemical compounds by sequential addition of chemical building blocks onto solid supports in a parallel manner to produce a combinatorial collection of compounds. The solid supports are in "reaction zones," with a single compound synthesized in each reaction zone. The number of different compounds which can be synthesized is thus equal to the number of reaction zones. The reaction zones are typically arranged in a 3-dimensional array, and are preferably maintained at fixed positions relative to one another during synthesis. An important feature of the invention is that the identity of a compound in a particular reaction zone is determined simply from the relative location of that reaction zone in the array. In this way, the need to encode the individual supports is eliminated.

Figure 1:
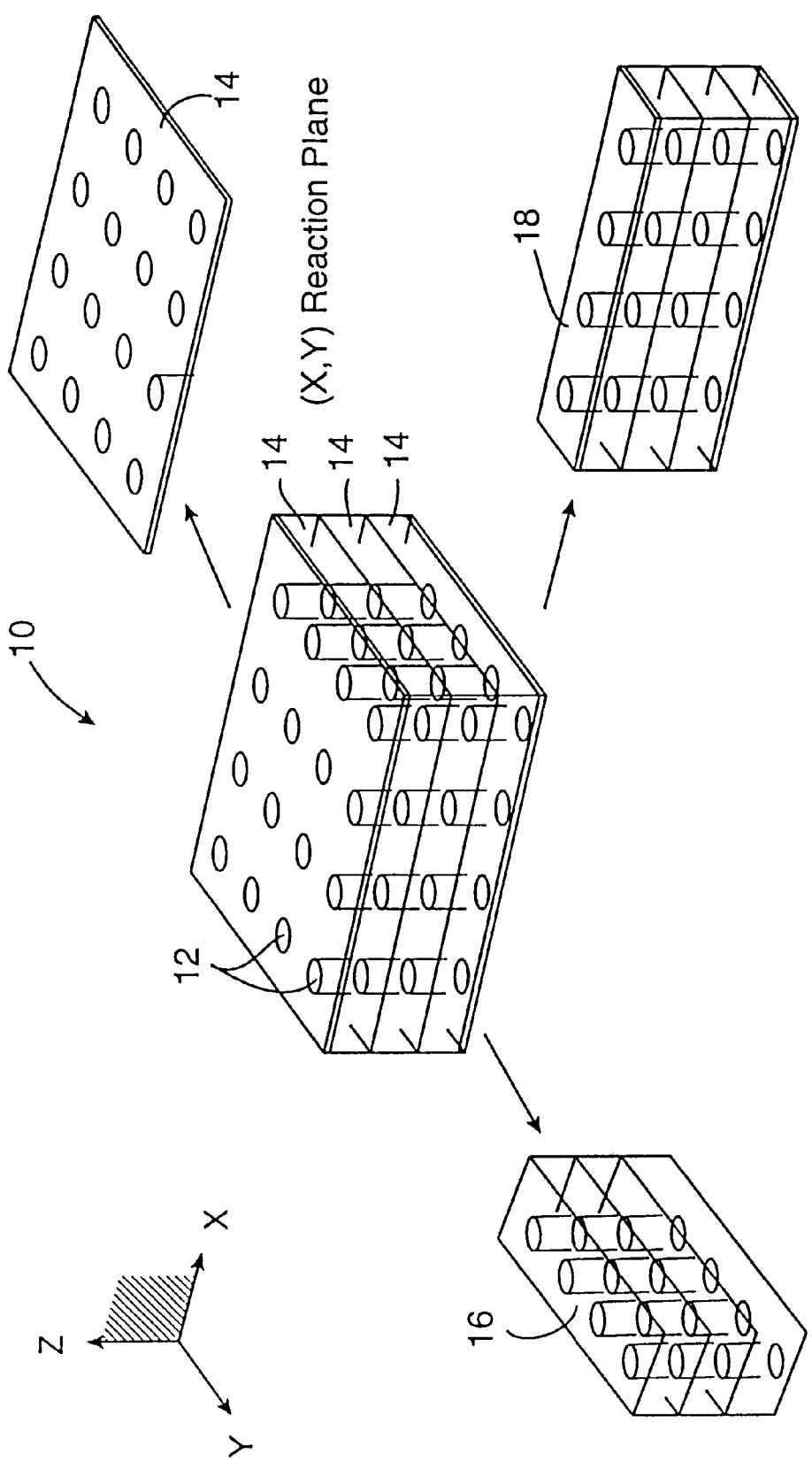
FIG. 1 is a schematic illustration of the (x,y,z) coordinate system of a 3-dimensional array of reaction zones, showing (x,y), (x,z), and (y,z) reaction vessel planes.

Referring now to FIG. 1, a schematic diagram of a reaction zone assembly 10 will be described. Reaction zone assembly 10 includes a three-dimensional (4×4×4) array of reaction zones 12. However, it will be appreciated that such a number of reaction zones are set forth merely for purposes of illustration, and any number of reaction zones which are arranged in a three dimensional array may be used according to the principles of the present invention. For convenience of discussion, reaction zone assembly 10 may be provided with an x,y,z coordinate system, and may be described in terms of two-dimensional arrays or "reaction planes" of reaction zones. Using such a coordinate system, reaction zone assembly 10 may be divided into four horizontal (x,y) reaction planes 14, each of which includes a two dimensional array of 16 reaction zones. In a similar manner, reaction zone assembly 10 may be divided into four vertical (y,z) reaction planes 16 and four vertical (x,z) reaction planes 18. Each of reaction planes 16 and 18 also includes a two dimensional array of 16 reaction zones. Further, it will be appreciated that reactions zones 12 in planes 16 and 18 are arranged in 4 columns of 4 reaction zones per column. Each column contains reaction zones having common (x,y) but different z coordinates.

The use of a three dimensional array of reaction zones allows a different combination of chemical reagents or building blocks to be contacted or reacted with the supports in each (x,z) and (y,z) reaction plane. If the reaction zones in each (x,y) plane are pre-derivatized with a different first building block or scaffold, the resulting library will have a number of combinatorial compounds which is equal in number to the number of reaction zones. For example, since reaction zone assembly 10 of FIG. 1 includes a 4×4×4 array of reaction zones, the maximum number of chemical compounds that may be produced is $4^3$ or 64. Moreover, as previously described, the particular compound or chemical combination synthesized onto a specific support will be known based upon the location of the reaction zone which contained the support.

One exemplary method for producing such a combinatorial collection of compounds using reaction zone assembly 10 will next be described. For convenience of discussion, the method described is one where the maximum number of combinatorial compounds is produced (i.e., a number equal to the number of reaction zones). However, it will be appreciated that fewer compounds may be produced simply by duplicating one or more of the chemicals or building blocks that are introduced into the reaction zone planes.

In the method, each of the reaction planes is provided during synthesis with a different building block to produce 43 chemical combinations. Each reaction zone contains a solid support, which is preferably pre-derivatized with one of four different first building blocks. The four different first building blocks are typically distributed such that all reaction zones in the top (x,y) reaction plane 14 contain supports prederivatized with the same first building block. Similarly, the (x,y) reaction plane disposed below the top (x,y) reaction plane is uniformly provided with a different first building block, and so on. In this way, reaction zone assembly 10 will initially be provided with supports having four different chemical building blocks derivatized thereto.

A second chemical building block is then introduced into the reaction zones of each of the (y,z) reaction planes, such that supports in all zones having a common x coordinate value are contacted with the same second building block. The second building block is typically added under conditions which result in the formation of an intermediate product synthesized from the first building block and the second building block. In the final step, a third building block is introduced into the reaction zones of each of the (y,z) reaction planes, such that supports in all zones having a common y coordinate value (i.e., (y,z) planes) are contacted with the same third building block. As above, the third building block is typically added under conditions which result in the synthesis of the final compound formed from the first building block or scaffold, the second building block, and the third building block. If different building blocks are used in the different reaction planes as described above, the method results in the synthesis of a different compound in each of the reaction zones.

Of course, some of the chemicals may be duplicated so that the total number of chemical combinations will be less than the number of reaction zones. Further, it will be appreciated that each support may receive more or less than three building blocks to produce other kinds of combinatorial libraries.

III Exemplary Apparatus

Figure 2:
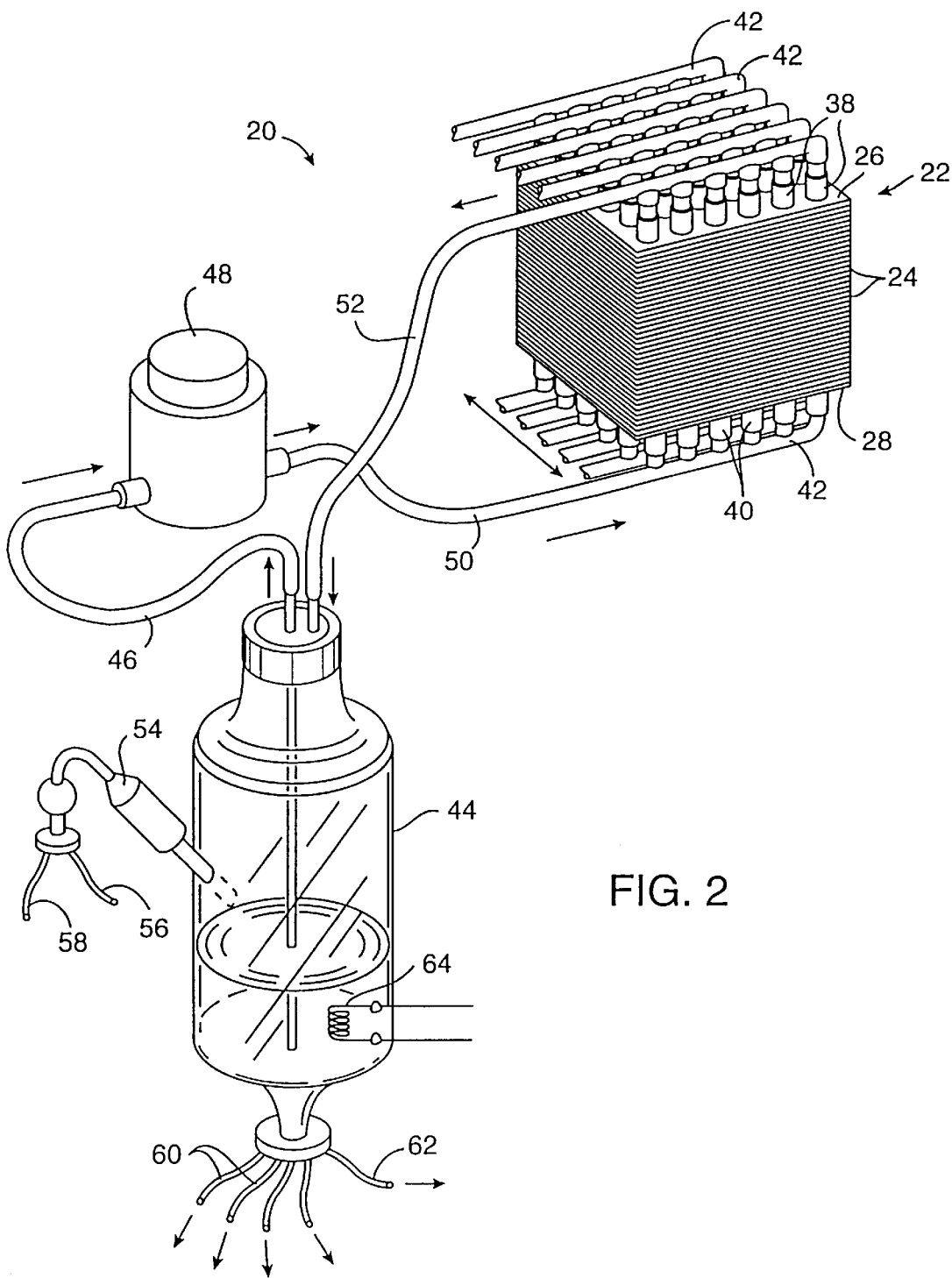
FIG. 2 is a perspective view of an exemplary system or apparatus for producing a combinatorial collection of compounds according to the invention.

Referring now to FIG. 2, a system 20 for addition of chemical reagents or building blocks onto supports to produce a combinatorial collection of compounds will be described. System 20 comprises a reaction zone assembly 22 having a plurality of stackable middle plates 24 and a pair of end plates 26 and 28.

Figure 3:
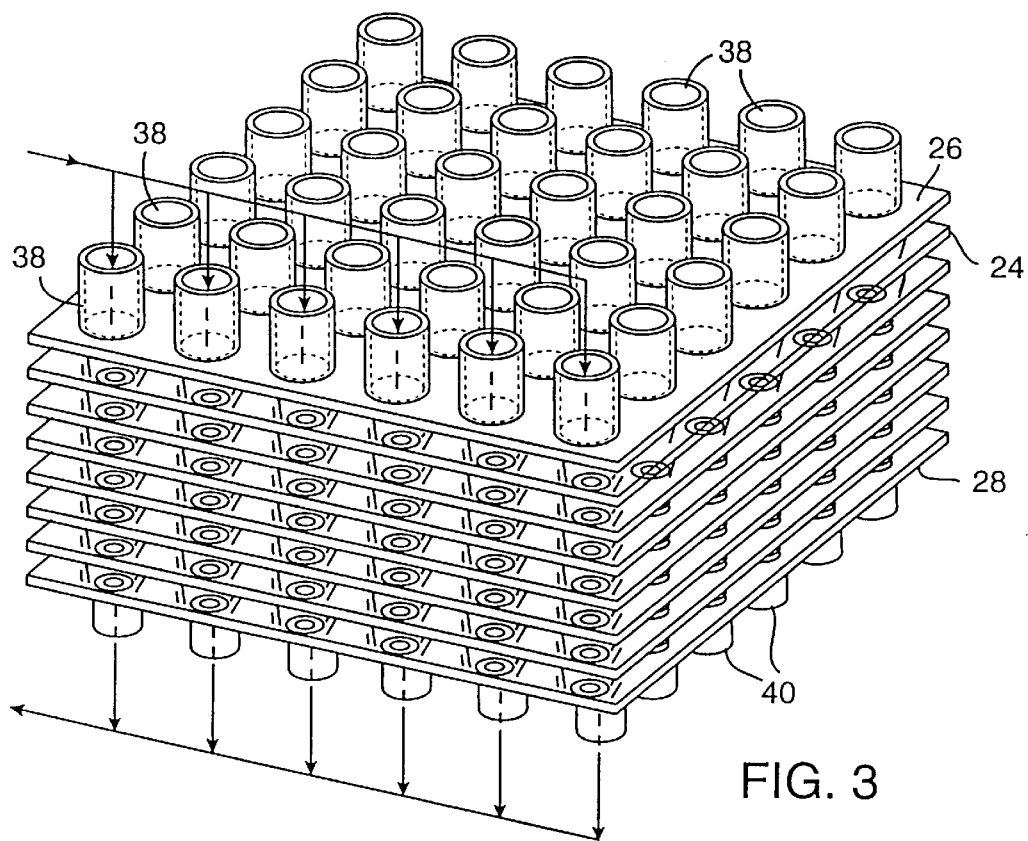
FIG. 3 is a perspective view of one embodiment of a reaction vessel assembly for the system of FIG. 2.
Figure 4:
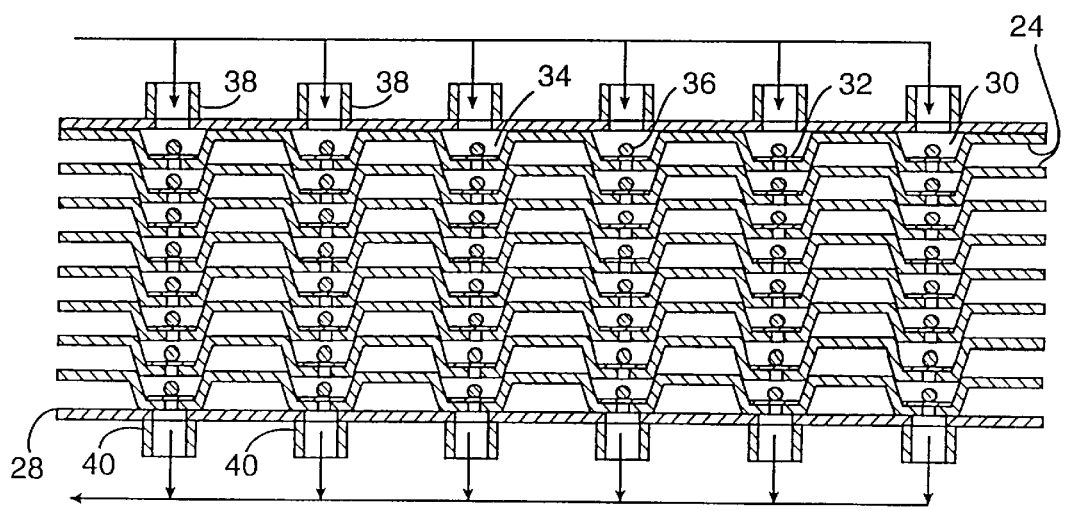
FIG. 4 is a cross-sectional side view of the reaction vessel assembly of FIG. 3.

As best illustrated in FIGS. 3 and 4, middle plates 24 each comprise a two dimensional array of wells or reaction vessels 30. By stacking middle plates 24 on top of each other, a three dimensional array of reaction vessels is created. Each of reaction vessels 30 includes an open top end and a hole 32 in a bottom end. In this way, chemicals may be circulated through a column of reaction vessels 30 as described in greater detail hereinafter. At the bottom end of reaction vessels 30 is a frit 34 covering hole 32. Resting upon frit 34 is one or more solid supports 36. Frits 34 hold the solid supports 36 within reaction vessels 30 as reagents, chemicals or building blocks are circulated through the reaction vessels. As discussed below, a seal (not shown) may be incorporated between the plates to prevent cross-contamination between the reaction vessels.

End plates 26 and 28 each include a plurality of fluid guides, here comprising cylindrical members 38 and 40, respectively, which are aligned with reaction vessels 30 when end plates 26 and 28 are aligned with middle plates 24. Referring back to FIG. 2, system 20 includes a plurality of manifolds 42 which are insertable into rows of cylindrical members 38 and 40. In particular, each row of cylindrical members 38 and 40 has its own manifold 42. Further, the manifolds which are attached to end plate 28 are in communication with a reagent source 44, such as a reagent vessel (only one being shown for convenience of illustration) so that a chemical reagent or building block may be circulated through the vertical columns of reaction vessels 30 which are aligned with manifold 42. The chemicals within different reagent sources 44 may all be different from each other or, alternatively, some of the chemicals may be the same.

Reagent source 44 delivers its chemical to manifold 42 through a tube 46 which in turn is connected to a delivery means, such as pump 48. Pump 48 pumps the chemicals from source 44, through tube 46, and into a tube 50 where it flows into manifold 42. Tubes 46 and 50 thus comprise a means to transfer reagents, chemicals or building blocks between the reagent source and the reaction zones. The tubes can be made from any material (e.g., PTFE) that is resistant to the reagents used with the system. Suitable PTFE tubing can be purchased from, e.g., Micro Biomedical Tubing (Cassville, Ga.), The Furon Co. (Fremont, Calif.), or David Schnur Associates (Los Altos, Calif.). After circulating through the vertical columns of reaction vessels 30 which are aligned with the manifold in end plate 28, the chemical enters into manifold 42 in end plate 26 and into a tube 52 where it is circulated back into reagent source 44. In this way, a particular building block may be continuously circulated through a two dimensional array or reaction plane of reaction vessels 30 for a selected period of time so that the step of the synthesis can proceed to the desired degree of completion. Of course, it will be appreciated that for certain types of reactions, such recirculation of the reagents through the reaction zones may not be required. In such applications, the reagent is introduced into the reaction zones for a selected period of time, and is then drained via tube 52 into either reagent source 44 or into a waste container. Alternatively, reagents or building blocks may be introduced through top end plate 26, rather than bottom end plate 28. Further, reaction zone assembly may be heated, cooled, agitated, vortexed or vibrated to maintain solid supports 36 in suspension at a desired temperature during the synthesis.

Conveniently, reagent source 44 may include a condenser 54. A vent 56 and a gas line 58 are coupled to the condenser to regulate the pressure within the system. Condenser 54 is typically maintained at a cooler temperature than the reagent in reagent source 44, in order to condense reagent vapors and allow the condensed reagent to drip back into reagent source 44. Gas line 58 is preferably connected to a source of inert gas (not shown), such as argon or nitrogen. A plurality of tubes 60 are provided to introduce various constituents into reagent source 44, and a waste tube 62 is provided to allow chemicals to be drained from reagent source 44.

A heater 64 may optionally be provided to regulate the temperature of the reagent within reagent source 44. In this way, the chemical reactions in the reaction zones may be conducted at selected elevated temperatures. Reagent source 44 may also be cooled, e.g., using a Peltier device, by immersion in a dry ice bath, or by other methods known in the art.

Pump 48 may be selected from a variety of commercially-available pumps, including peristaltic pumps, piston metering pumps, diaphragm pumps, syringe pumps and the like. Suitable pumps can be purchased from any of a variety of suppliers, e.g., Cole-Parmer Instrument Company (Vernon Hills, Ill.), Cavro Scientific Instruments Inc. (Sunnyvale, Calif.), and Advanced Flow Systems, Pump Express Div. (Elk Grove Village, Ill.). Like other components in the system, pumps are selected so that those parts of the pump that come in contact with the solutions and reagents used with the synthesizer are resistant to such solutions and reagents. Further, the pumps are preferably selected to be operable with solutions having temperatures in the range of temperatures which will be used during various synthesis steps. Preferably, the pumps are able to operate with solution temperatures between about −80° C. and about +100° C. Exemplary pumps having such characteristics include syringe pumps.

Figure 5:
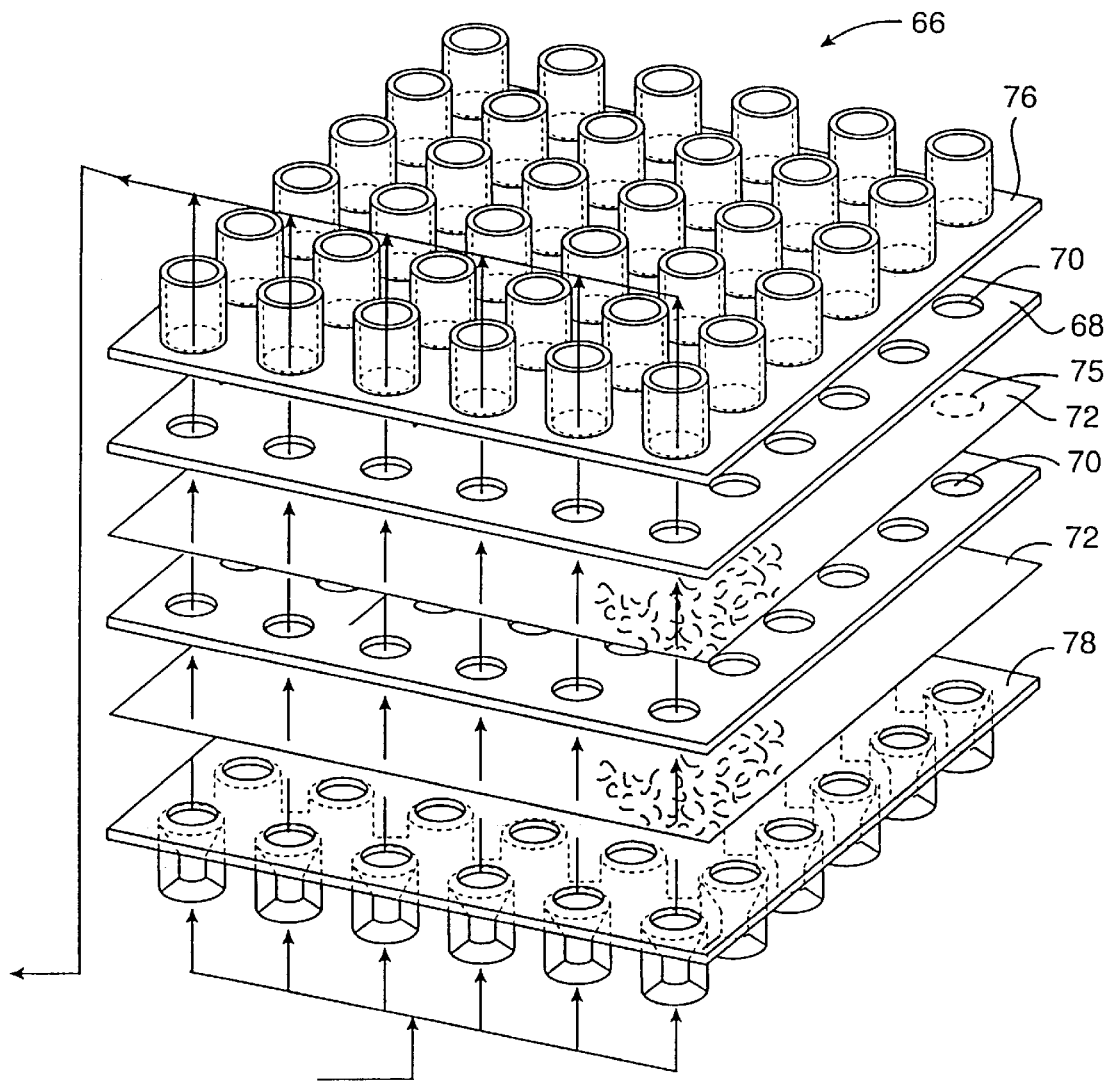
FIG. 5 is an exploded perspective view of another embodiment of a reaction zone assembly for the system of FIG. 2.
Figure 6:
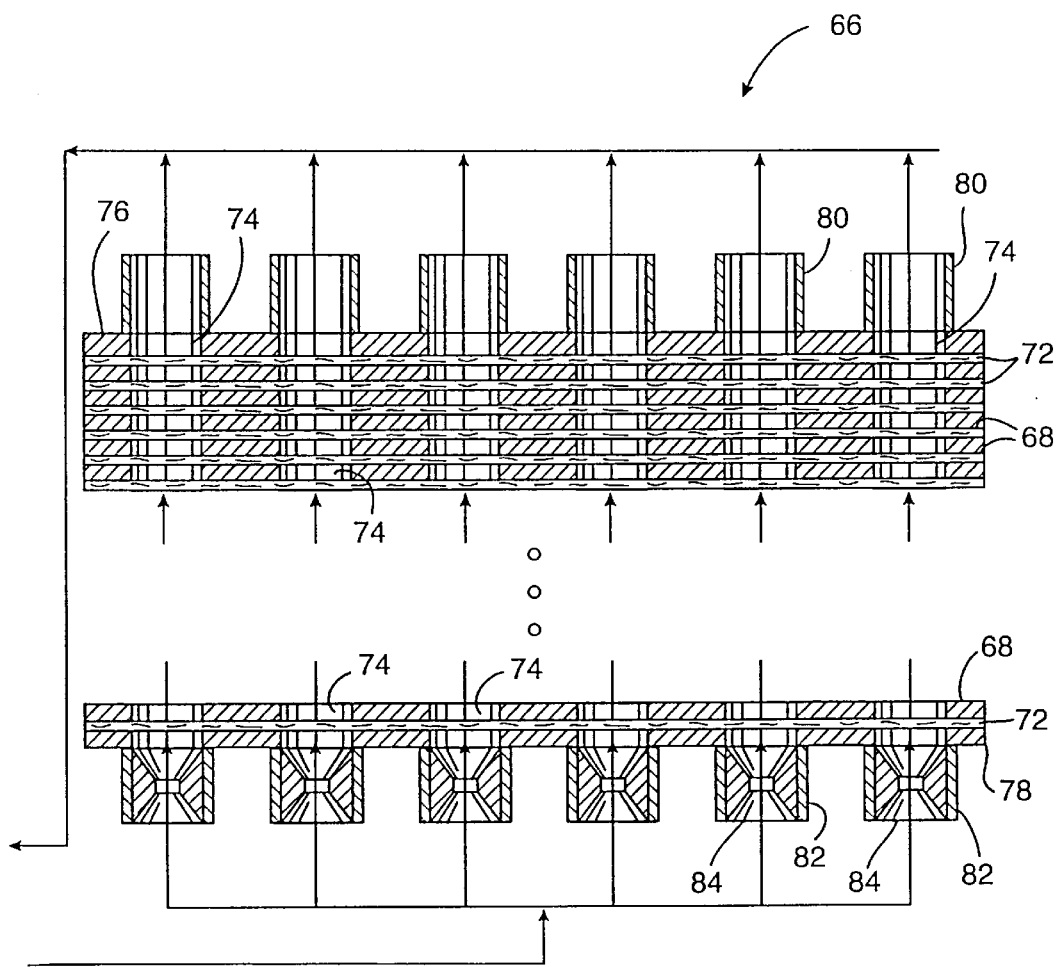
FIG. 6 is a cross-sectional side view of the reaction zone assembly of FIG. 5.

Referring now to FIGS. 5 and 6, an alternative embodiment of a reaction zone assembly 66 will be described. Reaction zone assembly 66 is configured such that it may be used as an alternative to reaction zone assembly 22 of FIG. 2. Reaction zone assembly 66 comprises a plurality of middle plates 68 which each include a two dimensional array of circular apertures 70. Disposed beneath each middle plate 68 is a membrane 72 so that when middle plates 68 are clamped together as shown in FIG. 6, a three dimensional array of reaction zones 74 is formed.

One particular feature of reaction zone assembly 66 is that the solid support in each zone is a region 75 of one or more membranes 72. Membranes 72 typically contain an initial set of chemical building blocks thereon, at least on region 75 corresponding to reaction zones 74. In preferred embodiments, all reaction zones on one sheet of membrane 72 will contain the same initial chemical, and different sheets, used to provide substrates in different (x,y) reaction planes, will be derivatized with different initial chemicals. The membrane may be pierced (e.g., with a needle) in one of more places per reaction zone, to facilitate flow of solutions through the membranes and/or to decrease the pressure required to circulate building blocks or reagents through the block assembly.

Suitable membranes for these applications include polypropylene membranes, polyethylene membranes, PTFE polyacrylate terpolymer membranes, PTFE polyacrylamide terpolymer membranes, and fluoropolymer membranes grafted with styrene, acrylate, acrylamide and the like. Exemplary membranes, containing an "OH" group suitable for derivitization, include "LCR," a PTFE polyacrylate terpolymer membrane, and "DURAPORE," a PVDF (polyvinylidene fluoride) polyacrylate terpolymer membrane, both available from Millipore Corp.(Bedford, Mass.). Such membranes may be derivatized using standard solid-phase chemistries, e.g., as described by Daniels et al. (1990). Other suitable membranes include "EMPORE" membranes available from 3M Corporation (St. Paul, Minn.). The "EMPORE" membranes contain resin beads entrapped in a mesh of PTFE fibers. Alternatively or in addition, a multi-component membrane suitable for use with the invention may be formed by trapping a layer of resin between two sheets of membrane (e.g., PTFE membrane) and fusing the resulting membrane "sandwich," e.g., by pressure and/or heating, in regions outside the reaction zones, forming an array of unfused "pockets" of resin spaced to correspond to reaction zones. Such a multi-component membrane affords an increased surface area of solid support available for reaction at each reaction zone, while preserving the advantages of synthesizing different compounds on a single sheet of membrane as detailed herein.

Reaction zone assembly 66 further includes a pair of end plates 76 and 78. End plate 76 is similar to end plate 26 of reaction zone assembly 22 and includes a plurality of cylindrical members 80 for receiving a manifold as previously described in connection with FIG. 2. End plate 78 includes a plurality of cylindrical members 82 which are each provided with a restrictive orifice 84 to regulate the flow of chemicals through cylindrical members 82. When circulating the chemicals through reaction zone 74, one or more of the reaction vessels may become partially occluded, thereby reducing the flow of chemicals through a particular vertical column of reaction vessels. In turn, an increased volume of chemicals would be diverted into the other reaction vessels. By restricting the flow of chemicals using orifice 84, a mechanism is provided to limit the amount of increased flow through the remaining reaction vessels. In this way, excessive flows will be prevented in the non-blocked reaction vessels, thereby insuring a predetermined volume of reagents through all columns. End plates 76 and 78 are rotatable relative to middle plates 68 so that chemicals may be circulated through reaction vessels 74 in a manner similar to that previously described in connection with system 20 of FIG. 2.

Figure 7:
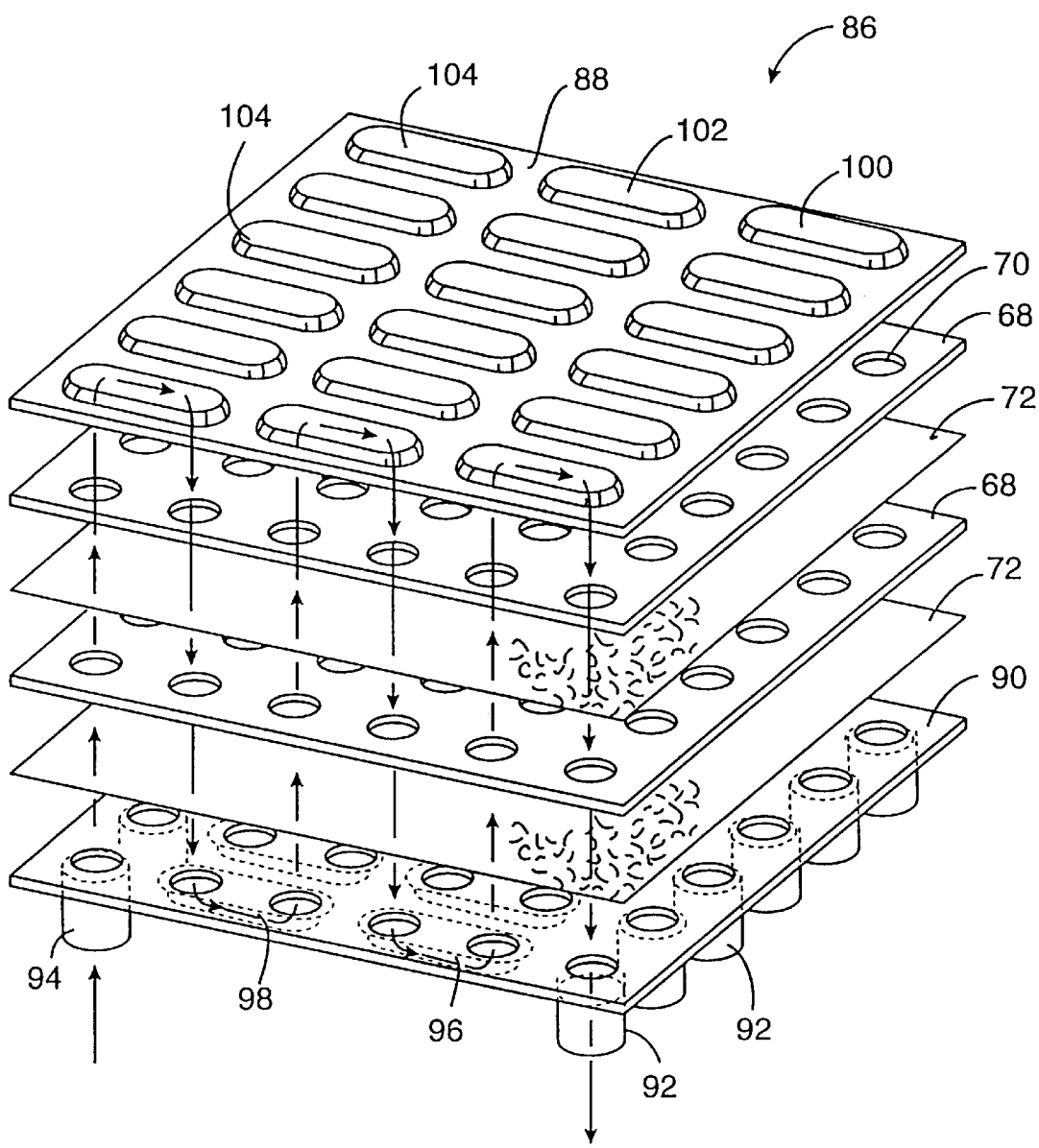
FIG. 7 is a perspective view of yet another embodiment of a reaction zone assembly according to the invention.
Figure 8:
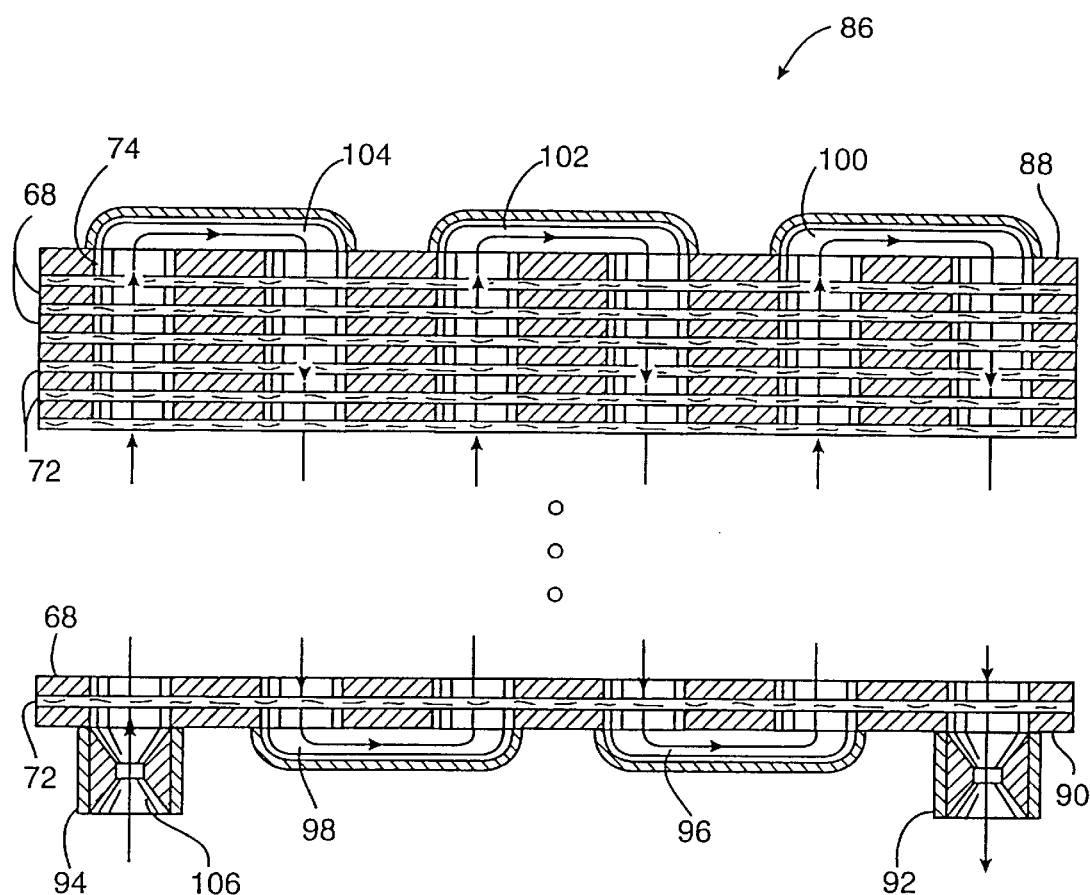
FIG. 8 is a cross-sectional side view of the reaction zone assembly of FIG. 7.
Figure 9:
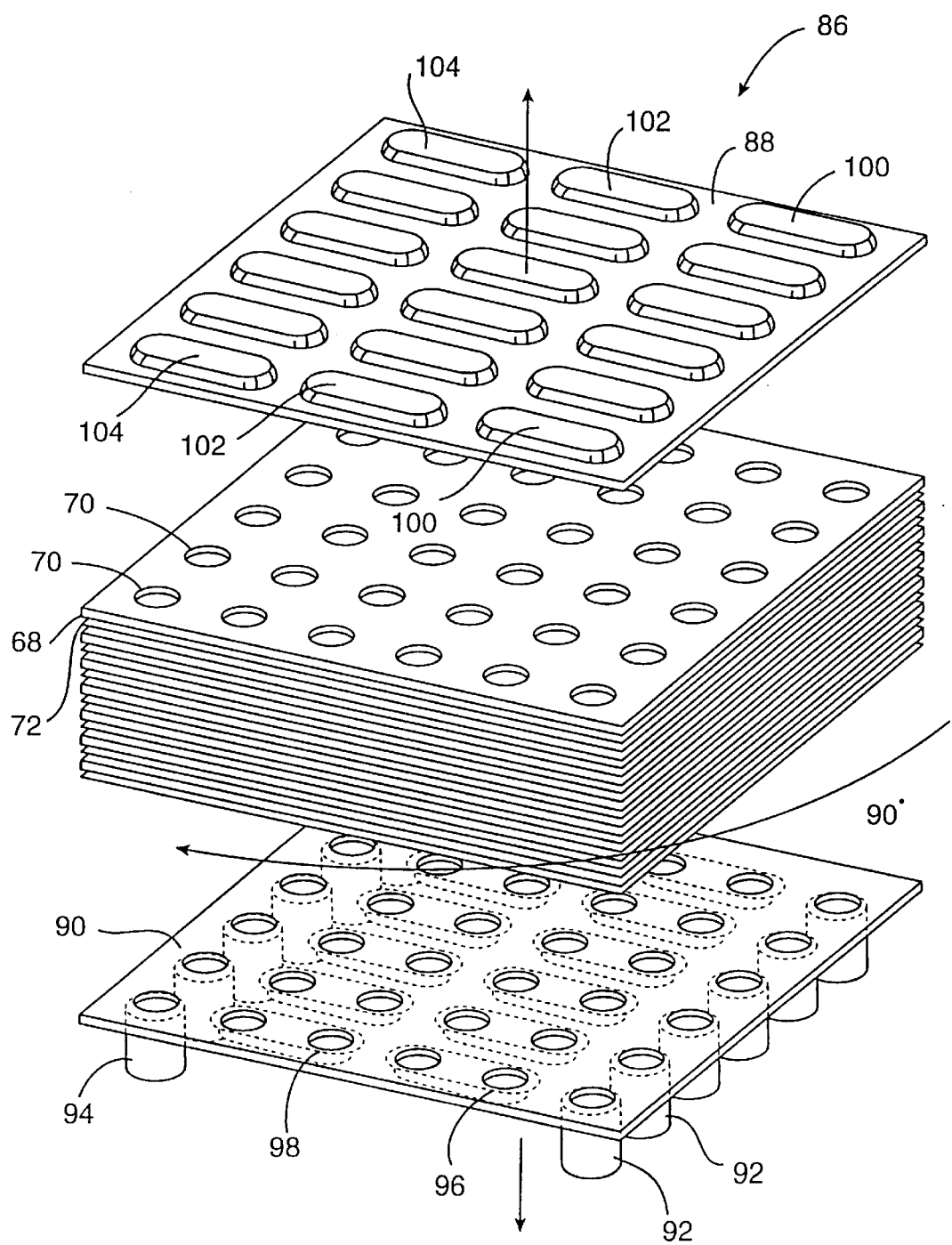
FIG. 9 illustrates the reaction zone assembly of FIG. 7, showing the rotation of a set of middle plates and membranes defining reaction zones relative to a pair of end plates having channels for circulating reagents through the reaction zones according to the invention.

Referring now to FIGS. 7–9, yet another alternative embodiment of a reaction zone assembly 86 will be described. Reaction zone assembly 86 may be used with system 20 of FIG. 2 and does not require the use of a set of manifolds. Reaction zone assembly 86 comprises a plurality of middle plates and membranes which are essentially identical to those described in connection with reaction zone assembly 66. For convenience of discussion, the same reference numerals used in connection with reaction zone assembly 66 will be used for similar elements in reaction zone assembly 86.

Reaction zone assembly 86 further includes a pair of end plates 88 and 90. End plate 90 includes two rows of cylindrical members 92 and 94 and two rows of channels 96 and 98, which serve as fluid guides in the end plates. End plate 88 includes three rows of channels 100, 102 and 104. As best illustrated in FIGS. 7 and 8, such a configuration of fluid guides allows a chemical from the reagent source to be introduced into cylindrical member 94 where it will pass through a vertical column of reaction vessels 74 and into channel 104. Channel 104 directs the chemical through an adjacent vertical column of reaction vessels 74 until the chemical passes through channel 98. Continuing on, the chemical then passes through channel 102, channel 96 and channel 100 until finally exiting through cylindrical member 92. In this way, the reagent source may be directly connected to cylindrical member 94, and a return line may be placed between cylindrical member 92 and the reagent source. As illustrated in FIG. 8, cylindrical member 94 may be provided with a restrictive orifice 106 to restrict the flow of chemicals through the reaction vessels in a manner similar to that previously described.

As illustrated in FIG. 9, end plates 88 and 90 are rotatable relative to middle plates 68. In this way, the middle plates may be rotated 90° to realign channels 96–104 with an orthogonal set of reaction vessel so that another building block may be added to the supports in a manner similar to that previously described.

Figure 10:
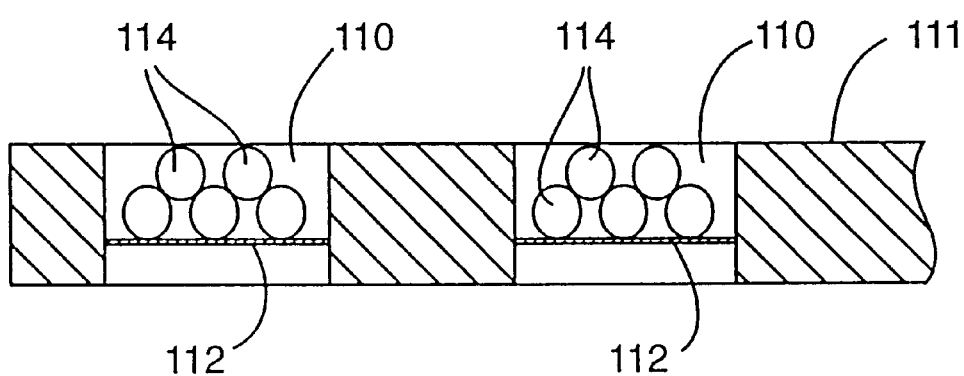
FIG. 10 is a cross-sectional side view of a middle plate having a plurality of dividers, where the void above each divider defines the lower portion of one reaction zone, and the void below each divider defines the upper portion of a different reaction zone, the zones being formed by the apposition of two or more such plates.

In embodiments utilizing reaction vessels, as opposed to reaction zones on a membrane, it may be desirable to place a plurality of beads into a reaction vessel. One convenient way to load the reaction vessels would be to cover the entire plate with beads and scrape off the excess, thereby completely filling each reaction vessel with the beads. A problem with this approach, however, is that the beads tend to swell when exposed to the solvents used during the chemical synthesis. Since the reaction vessels would be completely filled with dry beads, there would be no room to allow for swelling. This problem can be overcome by using the approach illustrated in FIG. 10. Each well 110 in middle plate 111 is provided with a divider 112, such as a frit or a membrane, so that only a portion of well 110 is provided with beads 114. A plurality of middle plates are then stacked on top of one another as previously described, such that each reaction zone is formed of two halves—the bottom half including well 110 filled with beads, and the top half including the portion of well 110 in an overlying middle plate below divider 112. In this way, when the beads expand, there will be sufficient area within each reaction zone or vessel to accommodate the expansion.

The dimensions of the reaction zones described herein will differ depending upon a variety of factors including the number of reaction zones, the types of chemicals employed, desired products, amount/yield of products and the like. To maximize efficiency and minimize the amount of reagents and building blocks required, the total volume in systems which recirculate the building blocks or chemicals through the reaction zones is preferably kept to the minimum required for efficient synthesis. The volumes required may be determined using standard calculations. For example, if each reaction zone has a diameter of about 0.7 cm (so that an array of such reaction zones can be conveniently arranged at the 0.9 cm spacing corresponding to a standard 96-well plate), and a height of ~0.076 cm (the height of two 0.015" thick PTFE middle plate sheets flanking the membrane on which synthesis occurs), the resulting volume per reaction zone is about 30 $\mu$l. An (x,y) reaction plane in a $12^3$ reaction vessel assembly would thus have a reagent volume of ~4.3 ml. The amount of compound which can be synthesized per unit area of membrane can be readily determined based on the surface density of derivatizable groups on the membrane (termed "membrane load"), a value which may be obtained from the manufacturer of the membrane or determined experimentally. Typically, this number is between about 0.04 and 4.0 $\mu$mole/cm2 of membrane, though membranes having smaller or larger membrane loads may be obtained. Assuming a membrane load of ~0.32 $\mu$mole/cm2, reaction zones having the dimensions described above could each support the synthesis of about 0.12 $\mu$mole of compound per sheet of membrane in the reaction zone.

The apparatus may be constructed of any suitable materials, such as aluminum, stainless steel, PTFE, ceramics, and various types of plastics, glasses, or metals. Those portions of the apparatus which will contact the reagents or building blocks are preferably constructed of, or lined with, materials that are not degraded by the various reagents that will be used with the apparatus. An exemplary apparatus can be made using a glass reagent vessel connected via PTFE tubing to stainless steel end plates having fluid guides lined with PTFE inserts. In an apparatus employing a reaction zone assembly such as is shown at 66 in FIGS. 5 and 6, or at 86 in FIGS. 7, 8 and 9, the middle plates may be, for example, PTFE sheets (e.g., 0.005"–0.05" thick sheets), available, e.g., from McMaster-Carr (Los Angles, Calif.). Exemplary middle plates comprise 0.015" thick PTFE sheets. Preferably, the middle plates are constructed from stainless steel plates, with exemplary plates being constructed from 0.005" thick 316 stainless steel sheets. When using non-complaint middle plates, a sufficient seal is provided between the plates do to the compliance of the membranes which are disposed between the plates.

Figure 11:
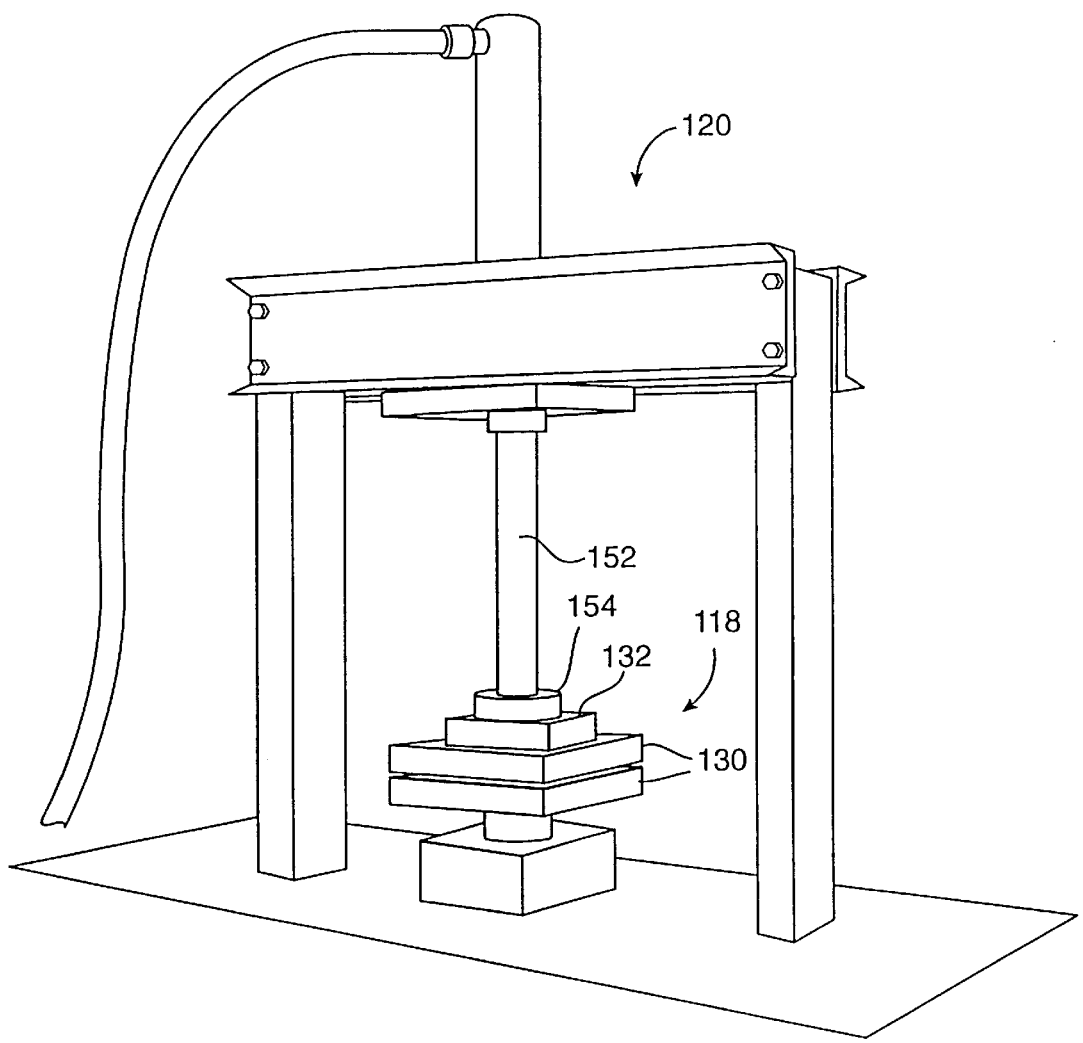
FIG. 11 is a perspective view of an exemplary apparatus for producing a combinatorial collection of compounds according to the invention.
Figure 12:
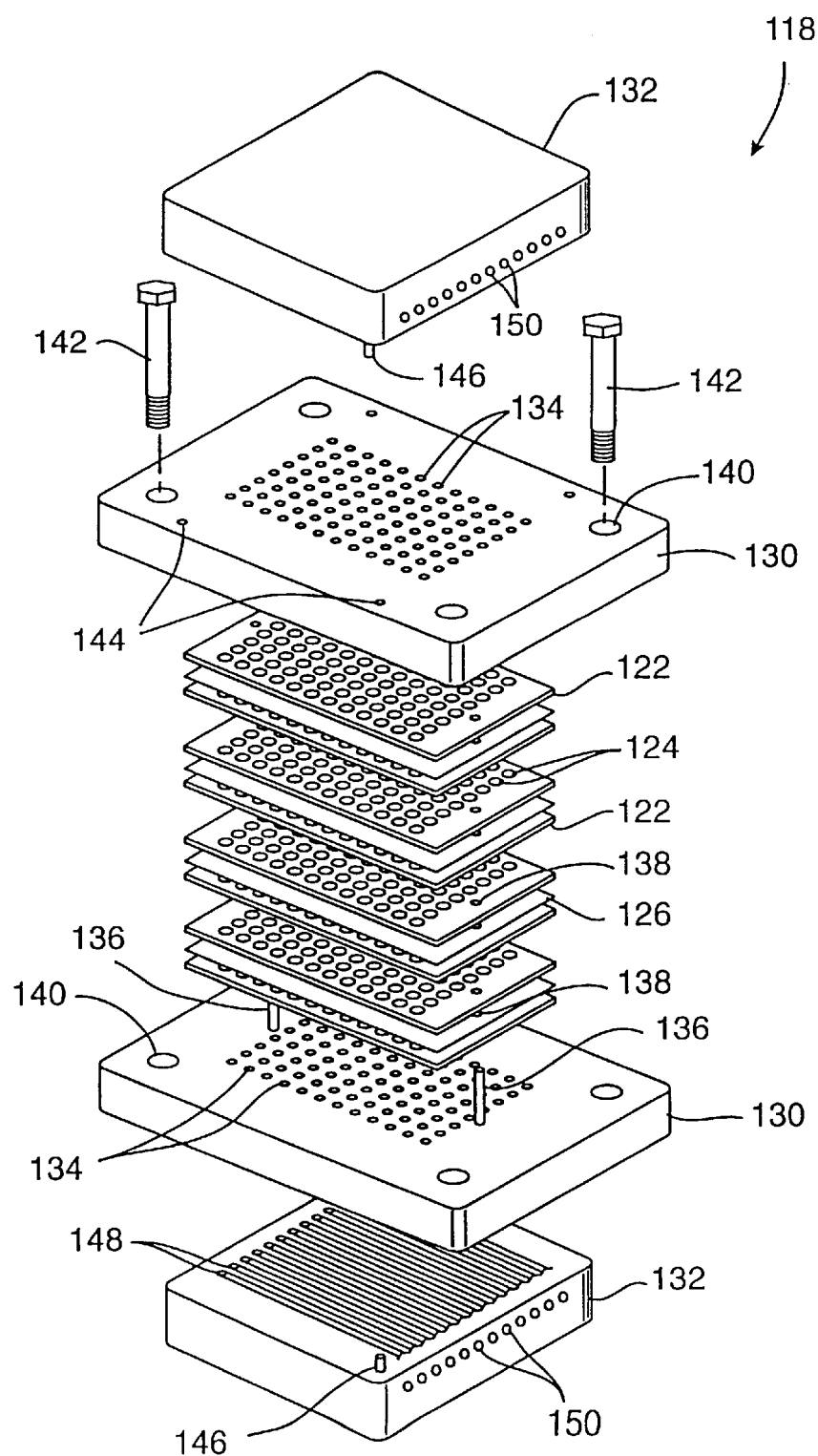
FIG. 12 is an exploded view of the reaction zone assembly shown in the apparatus of FIG. 11.
Figure 13:
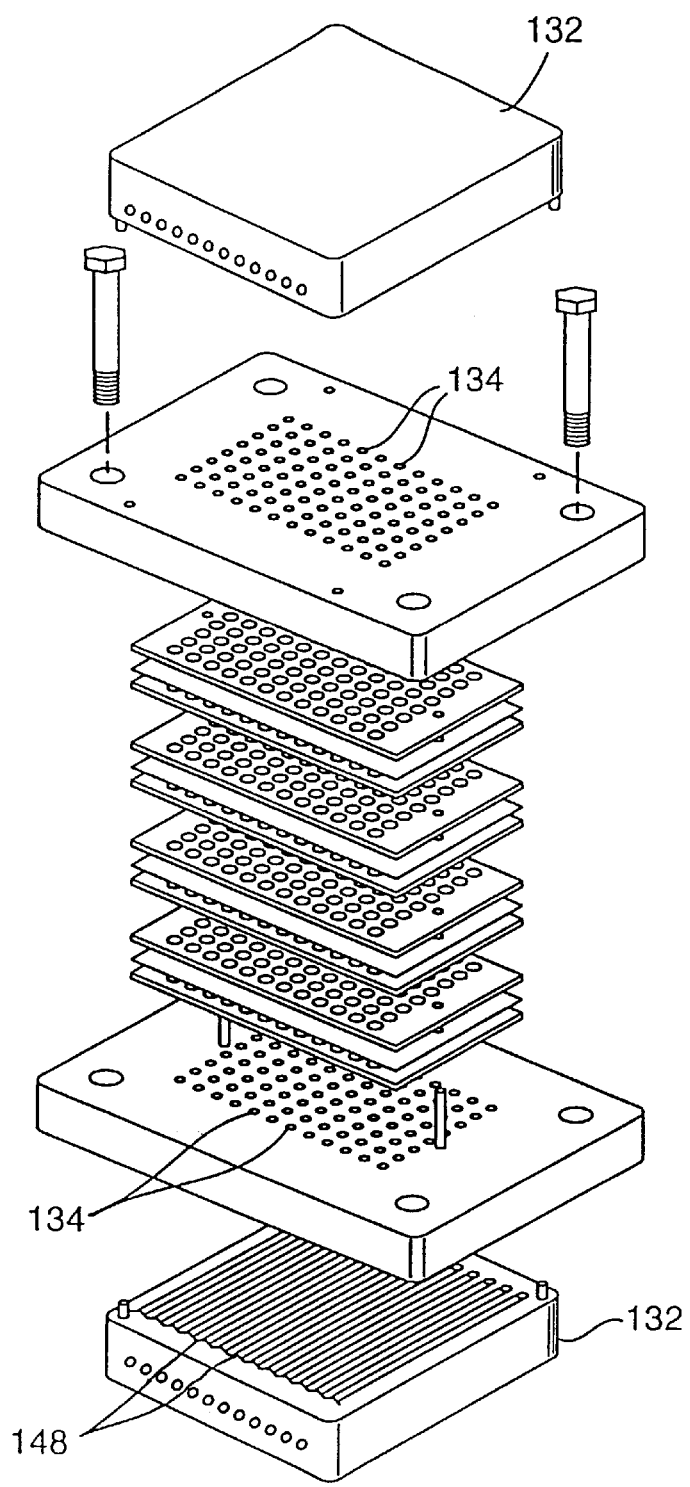
FIG. 13 is an exploded view of the reaction zone assembly of FIG. 12, with manifold plates rotated 90° relative to FIG. 12.

Referring now to FIGS. 11, 12 and 13, yet another alternative embodiment of a reaction zone assembly 118 will be described. Reaction zone assembly 118 is contained in a hydraulic press 120 to supply a clamping force, and is configured such that it may be used as an alternative to reaction zone assembly 66 of FIGS. 5–6. As best seen in FIGS. 12 and 13, reaction zone assembly 118 comprises a plurality of middle plates 122 with each middle plate including a two dimensional array of circular apertures 124. The middle plates are arranged in sets of two middle plates per set, with a membrane 126 between the middle plates of each set. When middle plates 122 are clamped together as shown in FIG. 11, a three dimensional array of reaction zones, similar to reaction zones 74 in FIG. 6, is formed. As was the case for reaction zone assembly 66 shown in FIGS. 5–6, the solid supports in each zone are regions of a sheet of membrane 126. The membranes and reaction zones have characteristics as described above, e.g., they typically contain an initial set of chemical building blocks thereon, at least on regions corresponding to reaction zones.

Reaction zone assembly 118 further includes a pair of clamping plates 130 and a pair of manifold plates 132. Clamping plates 130 each include a plurality of holes 134 spaced to correspond to the spacing of the reaction zones, with each hole 134 preferably being smaller than holes 124 in middle plates 122. One of clamping plates 130 further includes a pair of alignment pins 136 to engage alignment holes 138 in middle plates 122 and membranes 126, thus facilitating alignment of a column of reaction zones. Clamping plates 130 further include bolt holes 140 to allow the portion of reaction zone assembly 118 between the clamping plates to be secured together by bolts 142 and manipulated as a unit ("reaction block") independently of manifold plates 132. The reaction block can, of course, be secured by other means as well, including spring clamps, elastic straps and the like. Clamping plates 130 also include alignment holes 144 adapted to mate with alignment pins 146 of manifold plates 132 to align channels 148 of manifold plates 132 with rows or columns of through holes 134 in clamping plates 130. Manifold plates 132 further include ports 150 in fluid communication with channels 148, for connecting to sources of reagents, sample collection vials, waste lines, etc.

Manifold plates 132 can be rotated 90 relative to the reaction block, as is illustrated in a comparison of FIGS. 12 and 13. The reaction block in FIGS. 12 and 13 has the dimensions X=12, Y=8, and Z=4. In FIG. 12, channels 148 of manifold plates 132 are aligned with (x,z) planes of reaction zones and through holes 134 having a common y coordinate. In FIG. 13, however, channels 148 are aligned with (y,z) planes of reaction zones and holes 134 having a common x coordinate. Note that where the number of rows is not the same as the number of columns, the manifold plates are designed to have a number of channels equal to the greater of X and Y. Further, each channel has a length sufficient to cover the greater of X and Y. In the example illustrated in FIGS. 12 and 13, the reaction zones are distributed in 8×12 arrays, so manifold plates 132 each contain 12 channels, with each channel having a length sufficient to cover 12 adjacent reaction zones.

Although manifold plates 132 are shown with channels 148 open to face clamping plates 130, it will be appreciated that channels 148 may be enclosed inside manifold plates 132. In such embodiments, fluid communication between channels 148 and holes 134 (when reaction zone assembly 118 is clamped together as shown in FIG. 11 and described below) is provided by a plurality of manifold holes in manifold plates 132. The manifold holes put the channels in fluid communication with holes 134. This variation reduces the potential for reagents to spill from the channels when the manifold plates are separated from the reaction block for the 90° rotation.

Gaskets may optionally be provided between clamping plates 130 and manifold plates 132. The gaskets are patterned to match the geometry of openings in manifold plates 132. For example, in embodiments where the manifold plates have exposed channels, the gaskets have elongated openings corresponding to the channels, whereas in embodiments where the manifold plates have an array of exposed holes corresponding to holes 134, the gaskets have a corresponding array of holes. Gaskets may be fashioned from, e.g., PTFE sheets or "KALREZ" perfluoroelastomer (Dow Corning Chemical Company, Midland, Mich.; available from Bay Seal Co., Hayward, Calif.).

To achieve a seal between adjacent zones on a (x,y) reaction plane, the manifold plates are clamped around the reaction block using, for example, a press. FIG. 11 illustrates reaction zone assembly 118 in a standard 10-ton hydraulic lab press, such as is available from McMaster-Carr (Los Angles, Calif.). The press force, delivered via a piston 152, is distributed over top manifold plate 132 with a stainless steel force distribution plate 154. The sealing pressure that is required is dependent on the pressure required to seal the membrane pores themselves. When using stainless steel middles plates, a force of about 600 psi is sufficient. If no special structures or "force directors" are used to direct the clamping force, i.e., the device is made using substantially flat middle plates 122, and if the middle plates have a compliance similar to that of PTFE (e.g., middle plates made from ~0.01"–0.05" thick PTFE sheets), then a clamping force of approximately 1200 pounds per square inch (psi), calculated with respect to the plate surface outside the reaction zones, is typically sufficient to form effective seals between adjacent reaction zones separated from one another by at least about 2 mm.

The total sealing tonnage required is dependent on the sealing pressure required at each interface times the sealing area. The actual sealing area depends on the geometry chosen for the sealing face, e.g. force directors, bosses, flat faces, and the like. For example, the sealing pressure required to seal an 8×12 array is about 10 tons. A 24×24 array of such zones can be sealed with a total force of about 60 tons, and more preferably about 75 tons.

Figure 14:
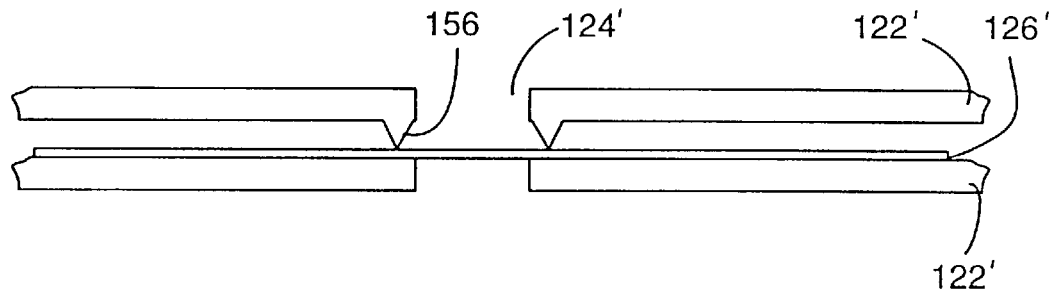
FIG. 14 is a cross-sectional side view of a reaction zone comprising a membrane and 2 middle plates with force directors.

The clamping force may be supplied by a mechanism other than a hydraulic press. Examples of such alternate mechanisms include, but are not limited to, pneumatic presses, various types of clamps, bolts (e.g., bolts 142 in FIG. 12), and the like, as can be appreciated by one of skill in the art. Additionally, as shown in FIG. 14, at least one of middle plates 122' can be provided with force directors 156 surrounding holes 124'. Such force directors focus the clamping force in discrete regions surrounding each reaction zone of membrane 126', and thus act to decrease the clamping force required to seal off a reaction zone from adjacent reaction zones.

Middle plates may be fashioned from any suitable material that is resistant to the chemicals, reagents, building blocks, solvents and the like that will be used with reaction zone assembly 118 during chemical synthesis. One particularly preferable material is stainless steel, e.g. 0.005" thick 316 stainless steel sheets. Alternative materials include PTFE (e.g., 0.01"–0.05" thick PTFE sheets), corrosion-resistant metal (e.g., stainless steel plates), elastomeric tetrafluorethylene fluorocarbon polymers such as those sold under the trademark "KALREZ" by E.I. DuPont de Nemours Co., polystyrene, and the like. In a preferred embodiment, all middle plates are stainless steel sheets. Other embodiments may employ PTFE sheets. In other suitable embodiments, particularly embodiments employing a force director, one plate of each set of middle plates is a PTFE sheet, and the other is a stainless steel plate. Forming an effective seal is substantially facilitated if at least one of the pair of middle plates flanking the membrane is elastic enough to deform slightly under the compression used to form the seal. This allows the use of plates having slight surface irregularities (which might otherwise provide paths for fluid communication between adjacent reaction zones), since the irregularities are smooth out by application of the clamping force. An exemplary material having such desirable elastic properties is PTFE.

Clamping plates and manifold plates are similarly made from materials which will resist corrosion by the reagents and solvents used with the device. Further, materials used for these plates (particularly the clamping plates) are preferably stiff enough (have a high modulus of elasticity) to avoid significant deformation under the clamping forces applied to maintain seals between adjacent reaction zones, in order to distribute the clamping force evenly across all reaction zones. An exemplary material having such characteristics is stainless steel (e.g., stainless steel). If additional corrosion resistance is desired, the holes or channels in end plates, clamping plates or manifold plates can be lined with a corrosion-resistant material, such as PTFE.

Figure 15:
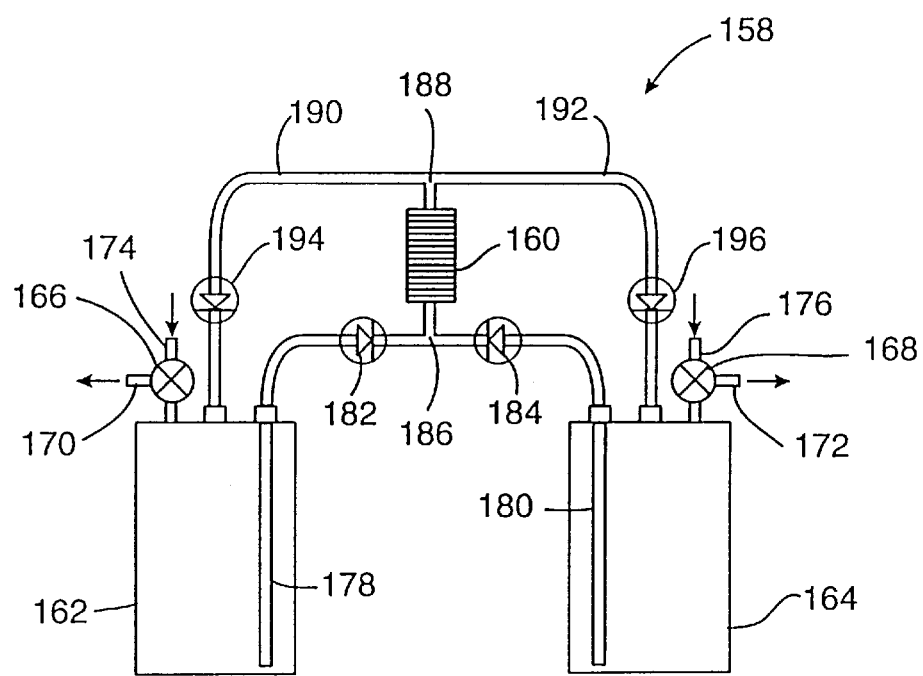
FIG. 15 is a reagent transfer mechanism, employing a pair of reagent vessels, suitable for use with the invention.

FIG. 15 illustrates a device 158, suitable for delivering reagents to a reaction zone assembly of the invention, that does not involve a "pumping" mechanism but is nevertheless suitable for circulating a reagent solution through a stack or bank of reaction zones or vessels, shown schematically at 160. Since device 158 includes no moving parts in the solution flow path (except one-way flow controllers), it is well suited for use with reactions conducted at very high or cold temperatures. Device 158 includes two sealed reagent holding vessels, 162 and 164. Vessels 162 and 164 are pressurized and/or vented via gas valves 166 and 168, respectively, which in turn each contain a vent port 170 and 172, respectively, and a gas inlet port 174 and 176, respectively. Vessels 162 and 164 further contain reagent tubes 178 and 180, respectively, which are open at their bottom ends and lead via respective one-way flow controllers 182 and 184 to a lower T-junction 186. The common limb of T junction 186 is connected to an inlet port or manifold (not shown) of reaction zone bank 160. The outlet port or manifold (not shown) of reaction zone bank 160 is connected to the common limb of upper T-junction 188, which splits into return tubes 190 and 192. Tubes 190 and 192 in turn lead, via one-way flow controllers 194 and 196, respectively, into the tops of respective reagent vessels 162 and 164.

In operation, reagent holding vessel 162 is filled with a selected reagent and sealed. Gas inlet port 176 is closed, and vent port 172 is opened. Vent port 170 is closed, and vessel 162 is pressurized with an inert gas, such as nitrogen or argon via gas inlet port 174. The increased pressure causes reagent in vessel 162 to flow up reagent tube 178, through one-way controller 182 and into lower T-junction 186. Since reagent is prevented from flowing the wrong-way past controller 184, it is forced into reaction zone bank 160. Upon exiting zone bank 160, the reagent flows via upper T-junction 188 into return tubes 190 and 192. However, since vessel 162 is pressurized and vessel 164 is not, the reagent will flow via tube 192, through one-way flow controller 196, and into vessel 164. When a sensor (e.g., an optical sensor) detects that the level of reagent in vessel 162 had dropped below a pre-selected point, the cycle is reversed: gas inlet port 174 and vent 172 are closed; vent 170 and gas inlet port 176 are opened; and the reagent in vessel 164 is circulated back to vessel 162 via reaction zone bank 160 as described above.

IV Synthesis Methods of the Invention

A. Mechanics

Referring back to FIGS. 3 and 4, an exemplary method for synthesizing chemicals onto supports 36 will be described. Supports 36 preferably comprise commercially available beads as are known in the art. The supports 36 are preferably each provided with an initial building block derivatized thereon before they are placed into reaction vessels 30. A record is maintained to keep track of which supports and their associated building blocks are stored in each of the reaction vessels 30. For example, in one preferred configuration, each middle plate 24 has supports with a first building block. To maximize the number of chemical combinations that may be produced, the building block on the supports in each of the middle plates is different from the building blocks in other middle plates, i.e., each middle plate has a different initial building block thereon.

A set of second building blocks from reagent sources 44 are then circulated through vertical plane, e.g., (x,z) planes, as illustrated in FIGS. 3 and 4, so that each of the solid supports in a given plane will receive the same second building block. The amount of building block delivered is usually 1 to 100 equivalents, preferably about 10 equivalents, at 100 mM concentration. The second building blocks are allowed to react, under appropriate reaction conditions, with the initial building blocks on the solid supports. The second building blocks are preferably continuously circulated during this reaction phase. If the reaction takes place at temperatures other than ambient, the reaction vessel assembly and/or the reagent sources are maintained at selected temperatures to maintain the temperature of the reaction at the proper temperature. To maximize the number of chemical combinations, each plane preferably receives a different second building block. After completion of the reaction coupling the second building blocks to the first or initial building blocks, each support contains an intermediate product. Circulation of the building block solution is then stopped, the second building block solutions are drained from the reagent vessels, and the reagent vessels may be filled with suitable wash solutions to wash the solid supports. Following any wash steps, the reagent vessels are drained.

Middle plates 24 are then rotated 90° relative to end plates 26 and 28 so that manifolds 42 are aligned with reaction planes that are perpendicular to the reaction planes that just received the second building block. For example, the (y,z) planes would now be aligned with manifolds 42. The reagent vessels are filled with a set of third building blocks, and this set is then circulated through each of the (y,z) planes to add the third building block to each of the intermediate products on the solid supports as described above. To maximize the number of chemical combinations, the chemicals circulated through the (y,z) planes will preferably be different from each other and be different from any of the chemicals used in the first or second building blocks. In this way, the number of combinatorial compounds produced will equal the number of reaction vessels. If any of the chemicals in reagent sources 44, or chemicals initially applied to solid supports 36, are duplicated, the number of combinatorial compounds will decrease.

Following the last synthesis step, the synthesized compounds will typically be cleaved from the solid supports into collection vessels or plates. A number of cleavage methods are known in the art. The particular cleavage reaction will depend on the type of linker used to attach the first building block to the solid support, as is discussed below. For cleavage, reaction zones containing different synthesized compounds are handled separately. If the reactions were carried out in reaction vessels contained in a plurality of stacked (x,y) planes, the planes are separated, and the compounds are transferred (with or without the solid supports) to sample plates for storage or subsequent manipulations. To transfer the compounds without the solid supports, the compounds must of course first be cleaved from the solid supports using the appropriate cleavage conditions as detailed below. If the reactions were carried out on membranes, sheets of membrane containing the reaction zones may be placed into a cleavage station, e.g., an apparatus similar to the synthesis device described above, except with only a single level or "z" value of reaction zones. Cleavage solution (e.g., TFA) is then passed through the device to cleave the compounds, and the compounds are eluted into a collection plate. Alternatively, portions of membrane (e.g., disks) corresponding to the reaction zones may be "punched out" from the sheets, and placed into individual vessels containing the cleavage solution.

In situations where the (x,y,z) dimensions of the reaction zone assembly are such that X is not equal to Y (such as is illustrated in FIGS. 12 and 13), it will be appreciated that the apparatus will be constructed to (i) be able to simultaneously supply a number of vertical reaction planes that is the greater of X or Y, and (ii) have fluid guides capable of supplying, in any given reaction plane, a number of columns that is the greater of X or Y. Accordingly, the apparatus will have an excess of plumbing, fluid guides, manifolds, reagent vessels, and the like at least one of the two orthogonal positions that the end plates assume relative to the stack of middle plates, and this excess capacity under such conditions will typically remain idle and/or be turned "off".

B. Chemistry

The present invention may be used in the synthesis of oligomeric as well as non-oligomeric compounds. Solid phase syntheses of oligomeric compounds, such as polynucleotides, polypeptides peptide-nucleic acids (PNAs), and the like, are well-known (see, e.g., Epton, R., 1994, incorporated herein by reference). Solid phase techniques suitable for combinatorial synthesis of non-oligomeric small molecules are also known in the art (see, e.g., Gordon et al, 1994; Thompson and Ellman, 1996; Früchtel and Jung, 1996; and Patel and Gordon, 1996, all incorporated herein by reference). Such techniques have been applied, for example, to the preparation of libraries of compounds based on a wide variety of heterocyclic structures, including benzodiazepines (Bunin and Ellman, 1992; Bunin et al., 1994; Plunkett and Ellman, 1995), hydantoins (Hobbs DeWitt et al., 1993), pyrrolidines (Murphy et al., 1995; Gallop et al., 1996; Maclean, 1997), thiazolidinones (Holmes et al., 1995; Holmes, 1996), thiazolidines (Patek et al., 1995), diketopiperazines (Gordon and Steele, 1995; Szardenings et al., 1997), diketomorpholines (Szardenings et al., 1997), tetrahydrofurans (Beebe et al., 1992), lactones (Moon et al., 1992), isoxazoles and isoxanolines (Pei and Moos, 1994), and other compounds. Accordingly, these techniques and others can be used in conjunction with the methods and devices of the present invention.

By way of example, the synthesis of a library of thiazolidinones, metathiazanones, and derivatives thereof, as detailed in Holmes (1996, incorporated herein by reference), comprises the following steps: first binding an amine component to a solid support. Preferably, the amine component will comprise a primary amine, and more preferably, an amino acid, a peptide, a mono-substituted hydrazine derivative or a hydrazide derivative. The heterocycle is then formed by treating the solid support-bound amine component, either sequentially or simultaneously, with a carbonyl component, preferably an aldehyde, and a thiol component, preferably an a-mercapto carboxylic acid or a b-mercapto carboxylic acid. The thiol component is immobilized on the support and the heterocycle is formed by treatment of the immobilized component with a carbonyl component, preferably an aldehyde, and an amine component, preferably an a-amino acid, a peptide, a mono-protected or mono-substituted hydrazine derivative or a hydrazide derivative.

Examples of resins suitable for solid-phase syntheses according to the present invention include glass, gold or other colloidal metal particles, and any of a large variety of polymer resins, typically made from cross-linked polymers, such as polystyrene, polystyrene-CHO, formylpolystyrene, acetyl polystyrene, chloroacetyl polystyrene, minomethyl polystyrene, carboxypolystyrene, Merrifield resin (cross-linked chloromethylated polystyrene). Other suitable resins include, but are not limited to, latex, cross-linked hydroxymethyl resin, 2-chlorotrityl chloride resin, trityl chloride resin, 4-benzyloxy-240'-dimethoxybenzhydrol resin, trityl alcohol resin, triphenyl methanol polystyrene resin, diphenylmethanol resin, benzhydrol resin, succinimidyl carbonate resin, p-nitrophenyl carbonate resin, imidazole carbonate resin, polyacrylamide resin, and the like. Resins such as those described above may be obtained, for example, from Aldrich Chemical Company (Milwaukee, Wis.), or from Advanced ChemTech, Inc.(Louisville, Ky.). Additional suitable resins include "AGROGEL", a grafted polyethylene glycol-polystyrene (PEG/PS) copolymer (Argonaut Technologies, San Carlos, Calif.) and "TENTAGEL" (Rapp Polymere GmbH, Germany).

Solid supports such as resins or membranes used with the present invention typically contain or are derivatized with any of a number of chemically reactive groups, which are in turn used to attach a linker (preferably a cleavable linker) to the support or resin. The linker in turn terminates in a suitable synthesis initiation site (reactive group) which is optionally protected, and which is used to attach the first building block, scaffold or portion of scaffold to the solid support. Examples of suitable reactive groups include alcohol, amine, hydroxyl, thiol, carboxylic acid, ester, amide, halomethyl, isocyanate and isothiocyanate groups.

Exemplary cleavable linkers include chemically-cleavable linkers and photocleavable linkers. Chemically-cleavable linkers include sulfoester linkages (e.g., a thiolated tagged-molecule and a N-hydroxy-succinimidyl support), cleavable by increasing pH (using, e.g., ammonium hydroxide), benzylhydryl or benzylamide linkages (e.g., a Knorr linker), cleavable by increasing acid concentration (using, e.g., trifluoroacetic acid (TFA)), and disulfide linkages (e.g., a thiolated tagged-molecule and a 2-pyridyl disulfide support, such as thiolsepharose from Sigma), cleavable with DTT (dithiothreitol). Suitable photocleavable linkers (reviewed by Lloyd-Williams et al., 1993) include 6-nitroveratryoxycarbonyl (NVOC), a-methyl-6-nitroveratryl alcohol and other NVOC related linker compounds (PCT patent publication Nos. WO 90/15070 and WO 92/10092), ortho-nitrobenzyl-based linkers (Barany et al., 1985) and phenacyl based linkers (Bellof and Mutter, 1985).

V Utility

Following synthesis, the compounds of the library are typically tested for a desired activity, e.g., agonist or antagonist activity, in an in vitro biological assay. Although the compounds are typically eluted from the solid supports prior to such assays, they may, if desired, be left attached to the supports. Performing such a subsequent assay serves at least two purposes: (I) discovery of new compounds with biological activity in a given screening assay, and (ii) development of a relationship between the structural variations contained within the series of compounds and biological potency (i.e., a structure activity relationship (SAR)).

Assays and screens of libraries of compounds are known in the art (see, e.g., Dower et al., 1997, incorporated herein by reference). Examples of suitable assays include receptor binding assays (screening for receptor agonists or antagonists), functional enzyme assays (measuring competitive or noncompetitive inhibition of the catalyzed reaction), and the like. The assays may be used in a variety of contexts, including screens for pharmaceutical agents, veterinary agents, diagnostic reagents, and the like.

VI Advantages of the Invention

The invention provides a simple method and apparatus for the parallel synthesis of large numbers of compounds in preparative quantities. The invention offers a number of advantages over prior art devices and methods. For example, there is no need to tag or encode the substrates on which the compounds are synthesized, since the identity of the compound in each reaction zone is determined based on the location of that reaction zone in the array. By varying the number of sheets of membrane in the reaction zones, the amount of compound synthesized at each zone can be varied to suit the requirements of the practitioner. Furthermore, the systems and methods of the invention minimize the amount of tubing and number of valves required for synthesis of large numbers of compounds In addition, the format in which the compounds are synthesized offers substantial advantages over prior art methods. For example, distribution of libraries of compounds is presently accomplished by sending multiwell plates containing the individual compounds in solution in the different wells. Such solution-based distribution suffers from a number of disadvantages, including potential breakdown of labile compounds, potential need for refrigeration/freezing, susceptibility to accidental spills (e.g., lab technician drops a stack of plates), difficulty in shipping, etc. Bead-based libraries where beads containing different compounds are segregated from one another also suffer from some of the above problems, including susceptibility to accidental spills.

In contrast, membrane sheets containing compounds synthesized as described herein can be conveniently stored in loose-leaf notebooks and distributed using standard envelopes. Each sheet (which can contain 100 or more reaction zones) needs to be marked only with an identifying number or code in a consistent orientation (so the orientation of the x,y axes defining the reaction zones is ascertainable). To assay the compounds in a multi-well format, all or a portion of each reaction zone can be punched out, distributed to "cleavage" plates, and the compounds can be cleaved from the solid supports and assayed as described above.

VII Other Exemplary Embodiments

Figure 16:
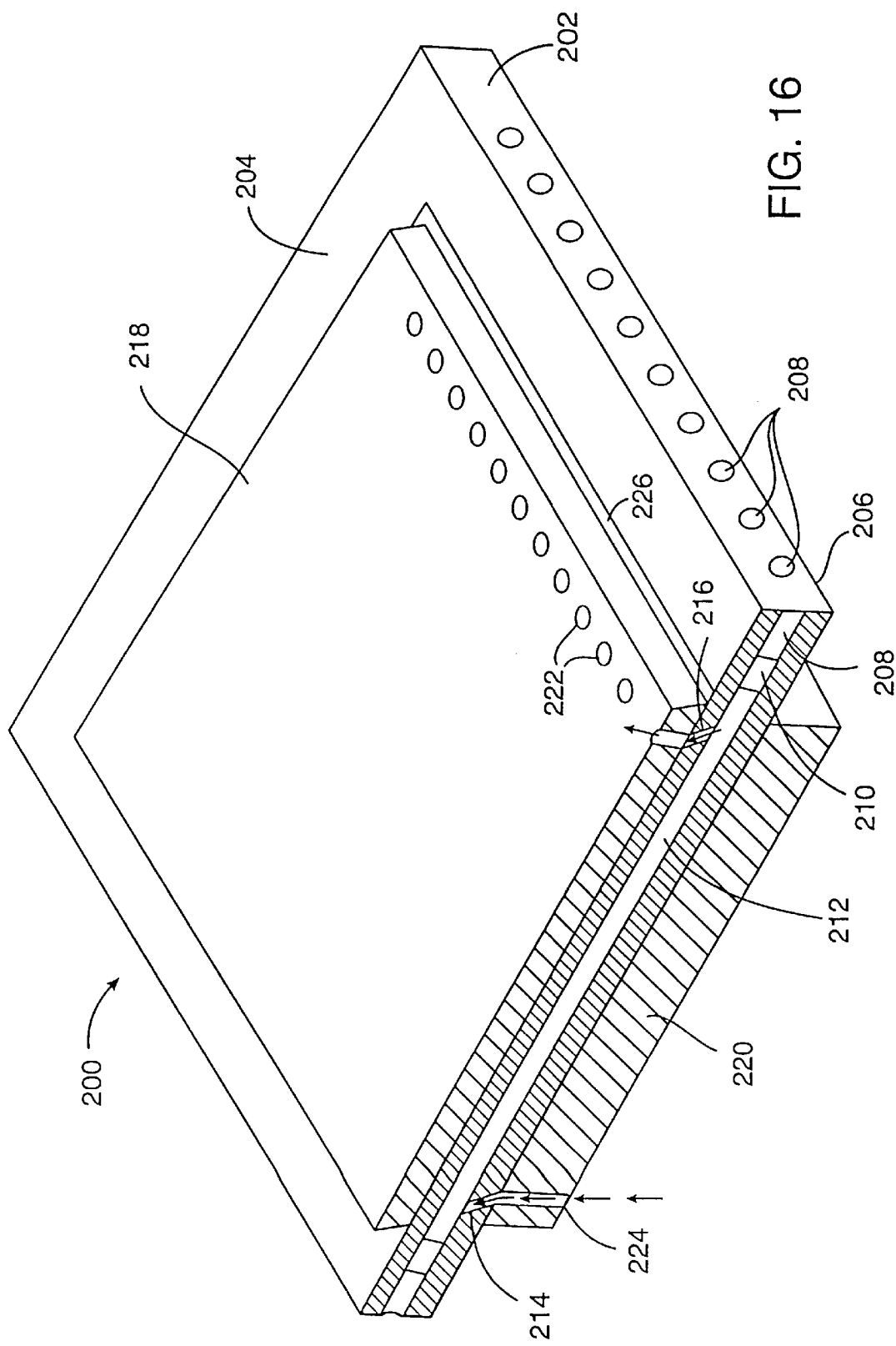
FIG. 16 is a partial cutaway view of a exemplary system for placing a building block onto a membrane according to the invention.

Referring now to FIG. 16, an exemplary embodiment of a system 200 for placing a building block onto a membrane will be described. System 200 is particularly useful in that it may be employed to place a first building block onto a set of membranes that are in turn used with the synthesizers described herein. System 200 operates to chemically treat sheets or membranes, either for derivatization or for loading building blocks. As previously described, by incorporating a first building block of a chemical library onto membrane sheets, a system is provided for producing a three dimensional array of building blocks. System 200 is advantageous in that it employees less reagents, washing solvents, and the like, than with standard manual methods.

System 200 comprises a flow plate 202 having a top side 204 and a bottom side 206. Formed within flow plate 202 are a plurality of elongate apertures 208. Apertures 208 may extend completely through flow plate 202, or only partially through flow plate 202. Apertures 208 are sized to each receive an elongate rod 210. In turn, rod 210 is configured to receive a membrane 212. More specifically, when rod 210 is removed from aperture 208, a membrane is wrapped or rolled around rod 210 which is then inserted into aperture 208. Once apertures 208 are loaded with membranes, end pieces (not shown) are preferably placed adjacent ends of flow plate 202 to close apertures 208.

In communication with aperture 208 is an inlet flow path 214 and an outlet flow path 216. Flow paths 214 and 216 are preferably angled (such as at a 45 degree angle) relative to aperture 208. In this way, a fluid may travel the length of membrane 212 before exiting flow plate 202. The angled nature of flow paths 214 and 216 is also advantageous in that it allows flow plate 202 to be used with a top plate 218 and a bottom plate 220. Plates 218 and 220 are preferably formatted to have the same size as the top and bottom manifolds of the synthesizers described herein. In this way, the same manifolds used to place the second and third building blocks onto the membrane sheet may also be used in connection with flow plate 202.

Top plate 218 includes a plurality of openings 222 and bottom plate 220 includes a plurality of openings 224. Openings 222 are aligned with flow paths 216 and openings 224 are aligned with flow paths 214. As indicated by the arrows in FIG. 16, a fluid containing a first building block is introduced into openings 224 where it passes through inlet flow path 214 and through aperture 208. In so doing, the first building block is deposited on membrane 214. The fluid then proceeds through outlet flow path 216 and through opening 222 where it exits the system. Preferably, a seal, such as a Teflon sheet 226 is disposed between top plate 218 and flow plate 202 and between bottom plate 220 and flow plate 202. Further, a press, such as press 120 (FIG. 11), is preferably employed to secure the plates together. In this way, liquids are prevented from leaking between the plates.

By using top plate 218 and bottom plate 220, the same fluid sources used with the other systems described herein may conveniently be used with system 200. As such, either the same or different building blocks may be provided on the membranes disposed within 208.

Following deposition of the building blocks onto the membranes, the end pieces (not shown) are removed and each rod 210 is removed from its respective aperture 208. The membrane is then unrolled from rod 210. Membranes 212 may be then placed between middle plates of the synthesizers described herein to have additional building blocks deposited thereon as previously described.

System 200 may be modified as shown in FIGS. 16A and 16B and referenced by numeral 200' so that top plate 218 and bottom plate 220 are not needed. System 200' has a flow plate 202' that does not utilize flow paths 214 and 216. Similar to system 200, system 200' allows a sheet or piece of membrane (used as a solid support) to be immersed in a continuous flow of fluid carrying chemical reagents. As a result, the entire membrane is chemically treated, whether for derivatization or for loading building blocks. By loading first building blocks of a chemical library onto sheets of membranes, system 200' adds the necessary third dimension to the reaction zone systems described herein.

System 200' includes a plurality of apertures 208' which are bored completely through plate 202'. In this way, a membrane may be spooled around a rod 210' which has been inserted into aperture 208' as shown in FIG. 16A. As shown in FIG. 16B, flow plate 202' includes opposing ends 217 and 219 which are sealed with blocks 221. In turn, blocks 221 are attached with fittings 223 and lines (not shown) that deliver fluids from various reservoirs so that the fluids may be circulated through apertures 208'. Conveniently, blocks 221 may also be coupled to the top or bottom plates of other embodiments described herein, e.g., plates 26 and 132. In this way, blocks 221 may be used when delivering building blocks to the reaction zone assemblies as described herein.

In use, plate 202' is placed vertically such that fluids enter through end 219 and travel upward until passing out end 217. By utilizing multiple apertures, multiple membranes may be included in plate 202', each of which may be exposed to the same or different chemical reagents. After the reaction is complete, blocks 221 are removed to allow the membranes to be removed.

System 200' is advantageous in that it may be operated in vertical orientation. In this way, the accumulation of air bubbles within apertures 208' is generally prevented. Further, by introducing and withdrawing fluids from ends 217 and 219, the need for top and bottom manifolds is eliminated. In this way, use of the system is simplified. Use of blocks 221 with fittings 223 is further advantageous in that blocks 221 may easily be removed from plate 202' and used with other reaction zone assemblies as previously described. In this way, each fitting does not need to be detached each time a change is made.

Another advantage is that heating or cooling of the fluids may be accomplished simply by placing a heating or cooling device adjacent sides 204' or 206', or both. By attaching the heating or cooling elements directly to plate 202', the efficiency of cooling and heating is increased. Further, blocks 221 may also be heated or cooled to increase the efficiency of heating and cooling of reagents which are delivered both to flow plate 202' as well as to other reaction zone assemblies. Finally, system 200' provides a significant reduction in the amount of reagents and solvents required compared to manual synthesis processes.

Figure 17:
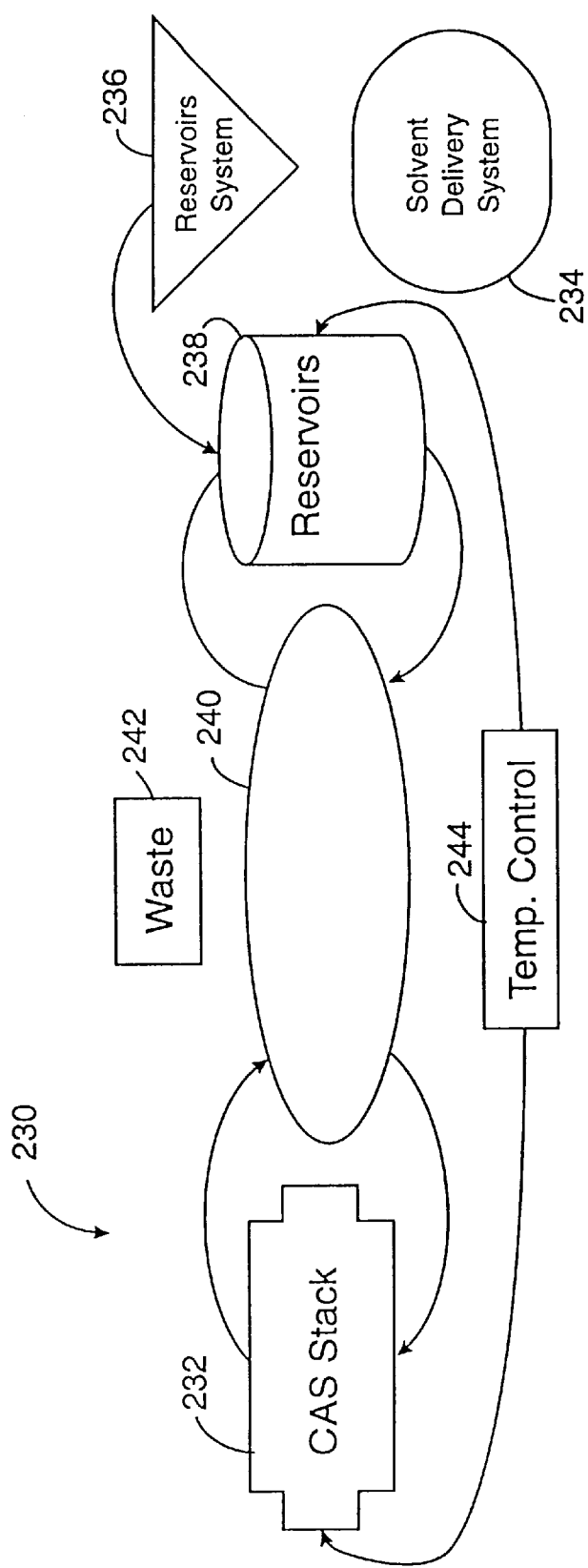
FIG. 17 is a schematic diagram overviewing an exemplary system for synthesizing a combinatorial library of compounds according to the invention.

Referring now to FIG. 17, an exemplary system 230 for synthesizing a combinatorial library of compounds will be described. Central to system 230 is a combinatorial array synthesizer (CAS) stack 232. CAS stack 232 includes a three dimensional array of reaction zones and may be constructed to be essentially identical to any of the three dimensional synthesizer systems described herein. System 230 further includes a solvent delivery system 234 which provides various reagents, solvents, gases, and the like to CAS stack 232. Solvent delivery system 234 is coupled to a solvent distribution system 236, which distributes the solvent from system 234 to a plurality of reservoirs 238. Reservoirs 238 serve as a delivery point for reagents, building blocks, and other solvents that are to be supplied to CAS stack 232. A liquid recirculation system 240 is employed to recirculate solvents from reservoirs 238, through CAS stack 232 and back to reservoirs 238. Liquid recirculation system 240 is also employed to drain solvents from CAS stack 232 to waste 242. Liquid recirculation system 240 in combination with solvent delivery system 234 may also be employed to gas dry various channels and reaction zones within CAS stack 232.

A temperature control system 244 is provided to control the temperatures within reservoirs 238 as well as in CAS stack 232. Temperature control system 244 may be employed to either heat or cool reservoirs 238 and CAS stack 232.

Figure 18:
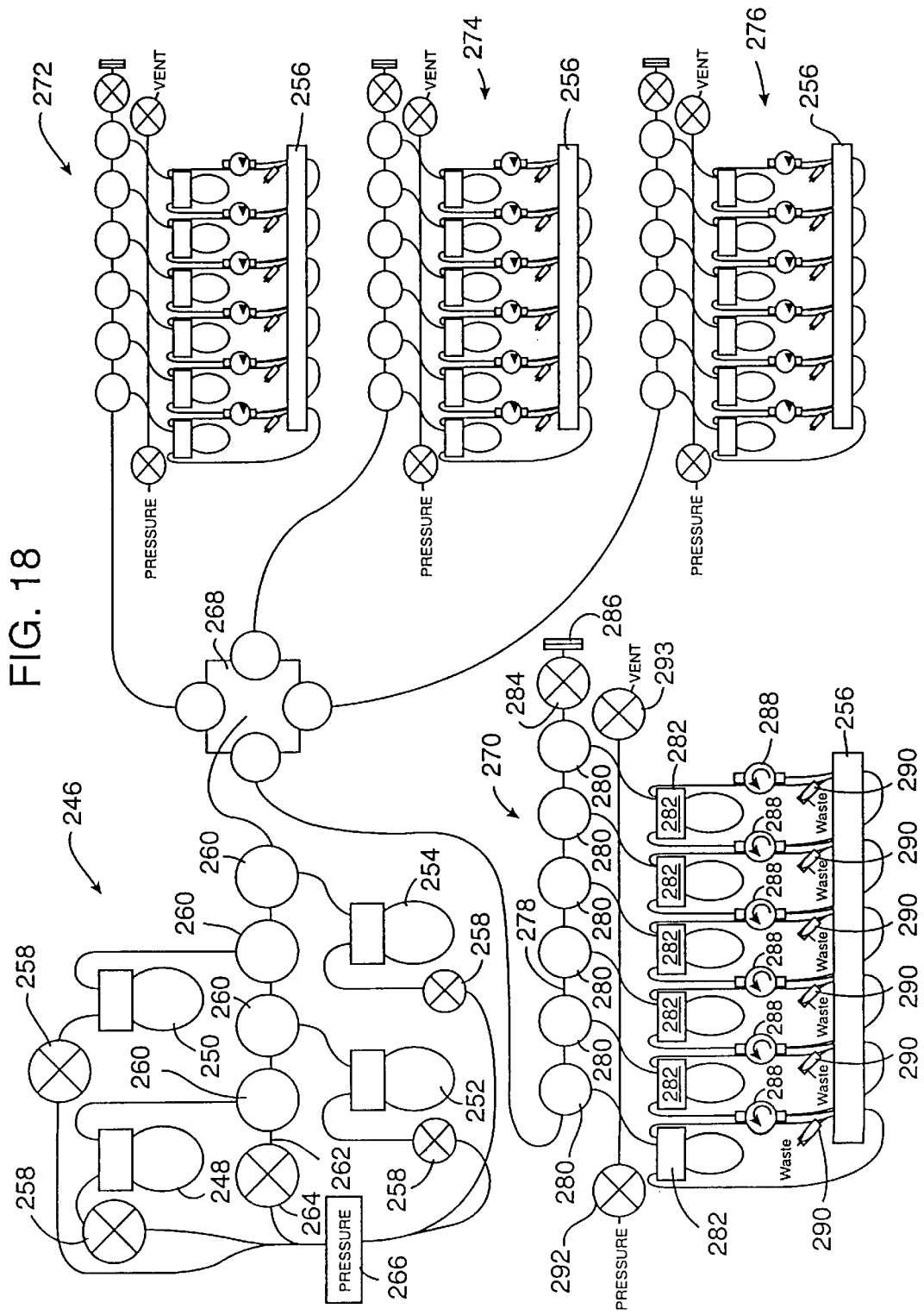
FIG. 18 is a schematic diagram of an exemplary system for producing a combinatorial collection of compounds according to the invention.

Referring now to FIG. 18, one particularly preferable embodiment of a system 246 for synthesizing a combinatorial library of compounds will be described. System 246 includes a plurality of bottles 248, 250, 252 and 254. Bottles 248–254 are employed to hold various solvents and solutions, such as reagents, washing solvents, and the like which are to be supplied to various CAS stacks 256. As shown in FIG. 18, CAS stacks 256 are representative of any of the three dimensional reaction zones described herein. Although shown with four bottles, it will be appreciated that essentially any number of bottles may be employed depending on the particular fluid that is desired to be supplied to CAS stacks 256. Merely by way of example, bottle 248 may include DCM, bottle 250 may include MeOH, bottle 252 may include DMF, and bottle 254 may include THF.

Disposed upstream of each of bottles 248–254 is a valve 258. Valves 260 are disposed downstream of each of bottles 248–254. Valves 260 are disposed along a first manifold 262, and upstream of first manifold 262 is a valve 264. A pressure source 266 (such as a supply of pressurized gas) is coupled to first manifold 262 and to each of bottles 248–254. With this arrangement, various fluids may be introduced into first manifold 262 by opening any one of valves 258 and corresponding valve 260. For example, if a fluid within bottle 248 were desired to be introduced into manifold 262, valve 258 upstream of bottle 248 would be opened and valve 260 downstream of bottle 248 would be opened. Further, more than one of valves 258 and 260 may be opened simultaneously so that a mixture of fluids from any of bottles 248–254 may be introduced into manifold 262. To force the fluid from manifold 262, valve 264 is opened. The fluid then travels to a valve bank 268 where the fluid may be distributed to any one (or all) of a plurality of banks 270, 272, 274 and 276. Although shown with four banks, it will be appreciated that essentially any number of banks may be coupled to first manifold 262.

For convenience of illustration, only bank 270 will be described, it being appreciated at banks 272, 274 and 276 are essentially identical to bank 270. Bank 270 includes a second manifold 278 having six ports. Six delivery valves 280 are coupled to second manifold 278 and control the delivery of fluids from second manifold 278 to six reservoirs 282. In turn, each reservoir 282 is coupled to CAS stack 256. As such, it will be appreciated that the number of reservoirs may be varied depending on the particular size and arrangement of the reaction zones within CAS stack 256.

Also coupled to manifold 278 is a valve 284 and a sensor 286. Valve 284 is opened when fluid is being delivered from first manifold 262 to second manifold 278. In this way, gases within the system may be vented through valve 284 to ensure that second manifold 278 will be filled with the fluid. Sensor 286 is disposed to sense when all of the gases have been vented and the liquid fills second manifold 278. Bank 270 further includes a vent 293 which is opened when valves 280 are opened to provide a vent so that reservoirs 282 may be filled with the fluid. Once reservoirs 282 are filled, the fluids may then be transferred to CAS stack 256.

Coupled between each reservoir 282 and CAS stack 256 is a pump 288. Pumps 288 are employed to recirculate fluids between reservoirs 282 and CAS stack 256. Preferably, each reservoir 282 is coupled to a two-dimensional array of reaction zones within CAS stack 256 so that building blocks may be provided on the solid support within each reaction zone in a manner similar to that previously described. Exemplary pumps that may be used with system 246 comprise piston metering pumps, Model RH00, commercially available from Fluid Metering, Inc.

System 246 is configured so that fluids within banks 270–276 may be dispensed to waste in one of two ways. First, disposed between each reservoir 282 and CAS stack 256 is a check valve 290. Check valve 290 is configured such that it will remain closed during normal operation where pumps 280 are recirculating the fluids between CAS stack 256 and reservoirs 282. When it is desired to remove the fluids from the system, a valve 292 is opened to increase the pressure within bank 270. Such an increase in pressure will meet or exceed the cracking pressure of check valves 290, thereby causing check valves 290 to open and allowing the fluids to exit the system. Exemplary check valves that may be used within the invention include ruby ball check valves, commercially available from Sapphire Engineering, with a cracking pressure set to about 12 psi. Alternatively, diaphragm valves may be used in place of check valves 290. In this case, a controller is preferably employed to control opening and closing of the valves.

Second, fluids may be removed from bank 270 by opening valve 292 and valve 284. In this way, fluids are drained from reservoirs 282 into second manifold 278 where they exit through valve 284.

System 246 is also configured to dry the reaction chambers within CAS stacks 270–276. Preferably, pressure source 266 is employed to supply a drying gas to CAS stack 256 by opening valve 264 and closing valves 260.

Although not shown in FIG. 18, system 246 preferably includes a temperature controller and temperature altering elements that will heat or cool reservoirs 282 and CAS stack 256. Preferably, reservoirs 282 will be held within a metal or aluminum block which includes strip heaters to heat the top and bottom of each bank. Cartridge heaters are preferably disposed in each of the CAS stack manifolds. A temperature controller is preferably used to control the heating elements that are coupled to reservoirs 282 and CAS stack 256. Preferably, the heaters may be employed to heat reservoirs 282 and CAS stack 256 to a temperature of about 150 degrees C. Cooling of reservoirs 282 and CAS stack 256 may be accomplished by the use of Peltier devices, by the use of liquid nitrogen or a thermal bath, and the like.

Figure 19:
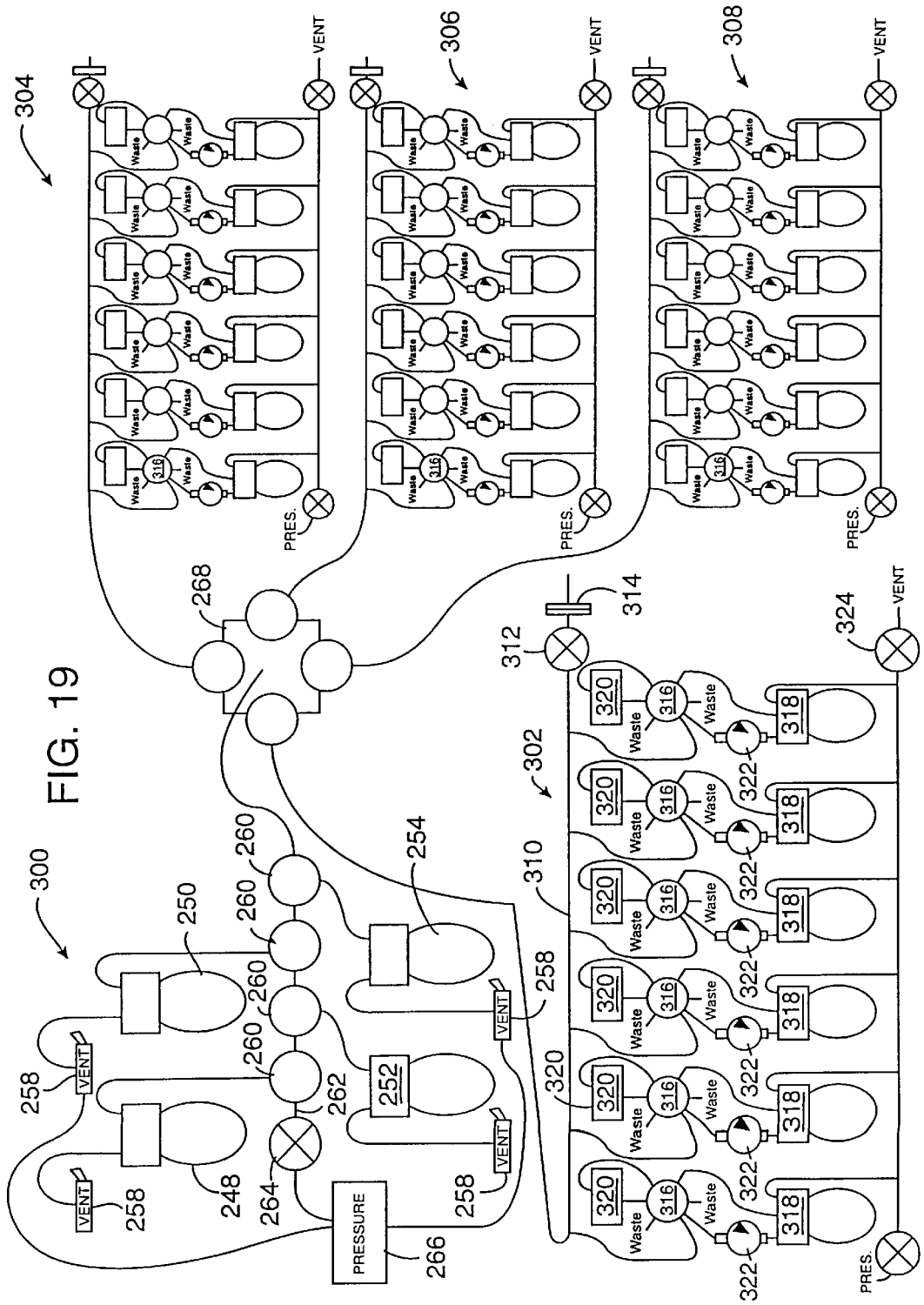
FIG. 19 is a schematic diagram of an alternative system for producing a combinatorial collection of compounds according to the invention.

Referring to FIG. 19, an alternative embodiment of a system 300 for synthesizing a combinatorial library of compounds will be described. System 300 employs the use of a solvent delivery system which is similar to the solvent delivery system employed by system 246 of FIG. 18. As such, similar elements will be referred to with the same reference numerals as used in FIG. 18 and will not be described further. System 300 differs from system 246 in the configuration of its banks 302, 304, 306, and 308. Banks 302–308 are essentially identical to each other. Hence, for convenience of illustration only bank 302 will be described.

Fluids from first manifold 262 are supplied to a second manifold 310 in bank 302. Coupled to second manifold 310 is a valve 312 and sensor 314 which assist in ensuring that second manifold 310 is filled with a fluid in a manner similar to that previously described with bank 270 of system 246. Manifold 310 includes six ports which allow second manifold 310 to be coupled to six multiple position valves 316. Multiple position valves 316 are disposed between reservoirs 318 and CAS stack 320. CAS stack 320 may be configured to be essentially identical to the other CAS stacks described herein. For convenience of illustration, CAS stack 320 is illustrated in separate components which each schematically represent a two dimensional array of reaction zones within CAS stack 320. Disposed between multiple position valves 316 and reservoir 318 are pumps 322.

Figure 20D:
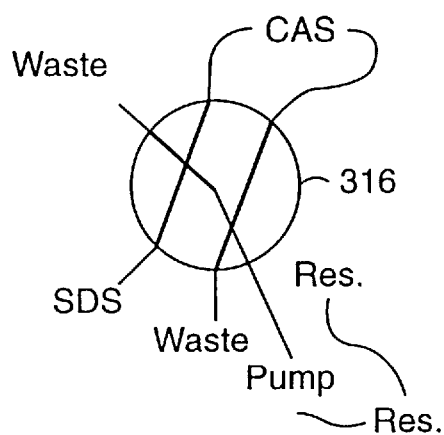
FIGS. 20A–20D schematically illustrate various positions of a multiple position valve which is included in the system of FIG. 19.
Figure 20C:
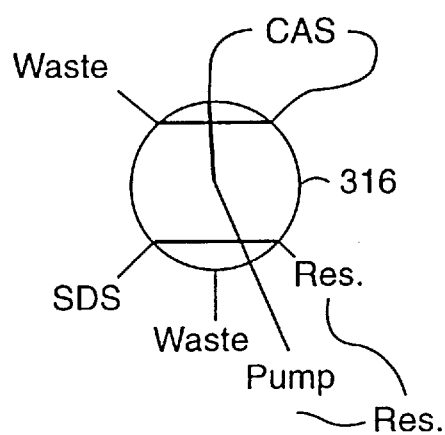

Multiple position valves 316 may be moved to six different positions to control the flow of fluids within bank 302. As used in the embodiment of FIG. 19, only four of the positions are employed and are illustrated schematically in FIGS. 20A–20D. FIG. 20A illustrates valve 316 in a solvent delivery position. The solvent delivery position is employed to deliver fluids which have been supplied to second manifold 310 into reservoirs 318. As shown in FIG. 20A, the fluid enters from the solvent delivery system (second manifold 310), passes through valve 316, passes through pump 322 and into reservoir 318. A valve 324 is opened during this process to vent reservoirs 318 so that they may be filled with the fluid.

Figure 20B:
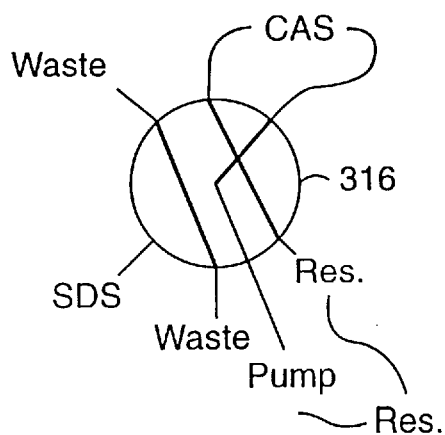
Figure 20A:
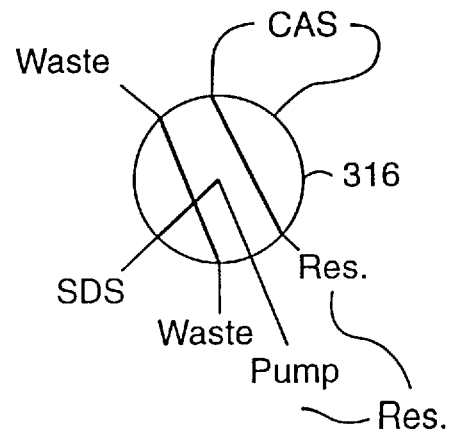

When reservoirs 318 are sufficiently filled, valves 316 may be moved to a recirculation position as illustrated in FIG. 20B. In the recirculation position, pump 322 is actuated to pump the fluids from reservoir 318, through valve 316, through CAS stack 320, back through valve 316, and into reservoir 318. In this way, the fluids within reservoirs 318 may be continuously circulated through CAS stack 320.

After recirculation is finished, it may be desirable to flow a washing solvent or solution through CAS stack 320. This is best accomplished by moving valve 316 to a solvent wash position as illustrated in FIG. 20C. In this position, a washing solvent which is within second manifold 310 is introduced through valve 316 and into reservoirs 318. Pump 322 is then employed to move the wash solvent through valve 316, through CAS stack 320, back through valve 316 and out to waste.

As illustrated in FIG. 20D, valve 316 may be moved to a gas dry position where a drying gas may be circulated through CAS stack 320 to dry the reaction zones and various channels within CAS stack 320. In the gas dry position, a gas which is supplied to second manifold 310 from pressure source 266 is flowed through valve 316, through CAS stack 320, back through valve 316 and out to waste.

Although not shown, it will appreciated that system 300 may include various heaters, coolers, and controllers to control the temperature and automate operation of the system similar to the system of FIG. 18.

Figure 21:
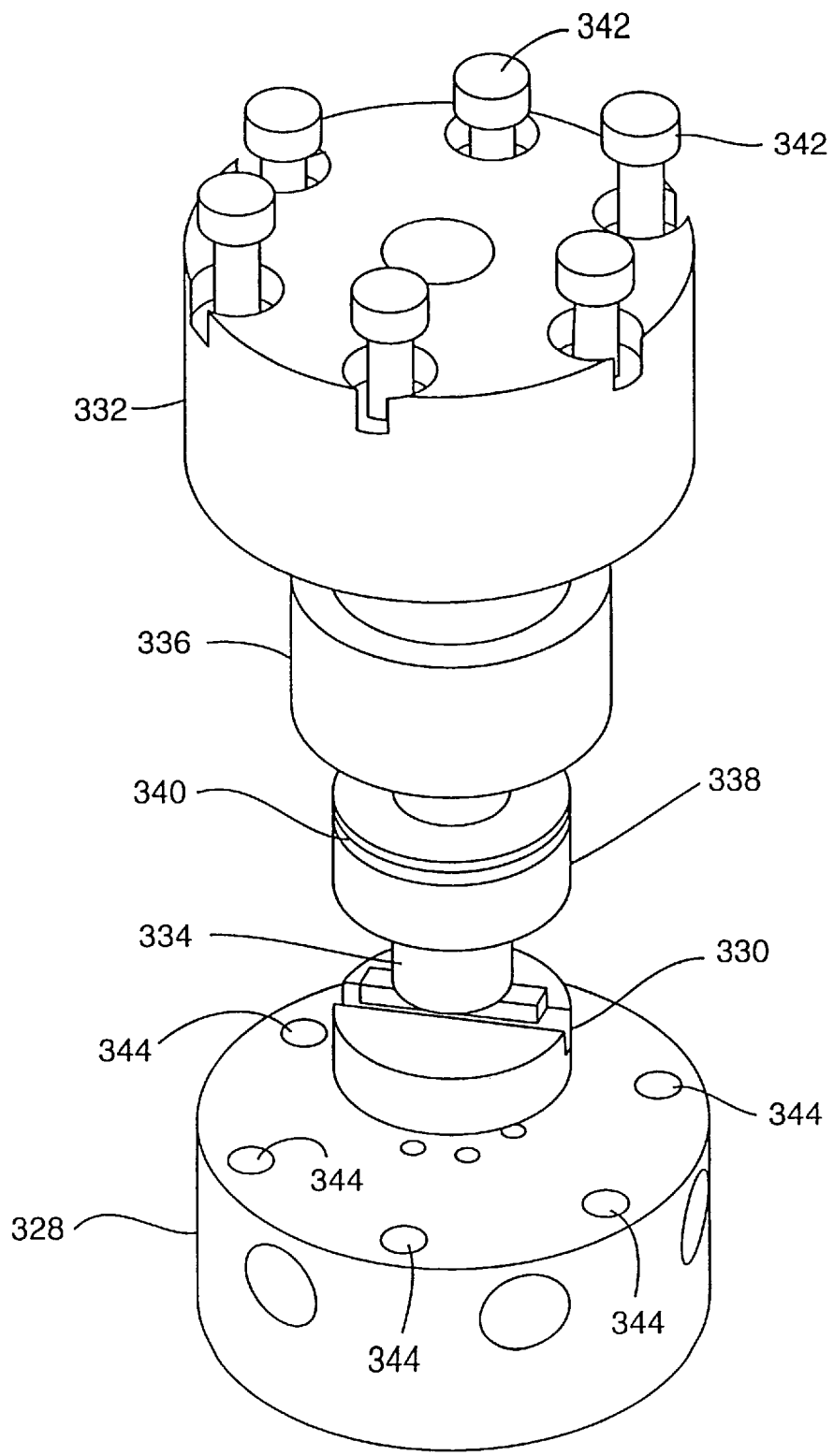
FIG. 21 is an exploded perspective view of an exemplary multiple position valve used in the system of FIG. 19.

Referring to FIG. 21, construction of an exemplary multiple position valve 326 will be described. Valve 326 is constructed of a valve body 328 and a valve rotor 330. A valve rotor retainer 332 is employed to secure valve rotor 330 to valve body 328 while allowing valve rotor 330 to freely rotate. A handle shaft 334 is employed to rotate rotor 330. Valve 326 further includes a sleeve bearing 336, a thrust bearing 338 and a washer 340, which cooperate together to assist in the rotation of rotor 330 upon torquing of shaft 334. Conveniently, screws 342 are employed to secure valve rotor retainer 332 to valve body 328 by inserting screws 342 into threaded holes 344.

The completed assembly of multiple position valve 326 is illustrated in FIG. 22. As shown, shaft 334 extends above valve rotor retainer 332 and may be rotated to move rotor 330 between six different positions. As best shown in FIGS. 25–25B, valve body 328 includes a plurality of side ports 346 which allow fluids to be introduced into or removed from valve 326. Valve body 328 further includes a bottom port 348 which provides an additional port for allowing fluids to enter into or exit from valve 326. Hence, side ports 346 and bottom port 348 provide seven different access ways into valve 326.

As best shown in FIGS. 24 and 24A, rotor 330 includes three slots, 350, 352 and 354. Slots 350-354 are configured such that they will be aligned with two of ports 346 and/or port 348 depending upon the rotational orientation of rotor 330 relative to body 328.

For example, three different positions of valve 326 are illustrated in FIGS. 23A–23C. In FIGS. 23A–23C, arrows are provided to show the general direction of flow through the valve. FIG. 23A illustrates a recirculation position which corresponds to the position of valve 316 in FIG. 20B. In the recirculation position, the fluids are pumped from the reservoir and up through bottom port 348 where slot 352 directs the fluid out through one of side ports 346 where it circulates through the CAS stack and back into another one of side ports 346. Slot 354 then directs the fluid out of one of side ports 346 where it will pass back into the fluid reservoir so that it may be recirculated.

FIG. 23B illustrates a solvent wash position which corresponds to the position of valve 316 of FIG. 20C. In the solvent wash position, the washing solvent from the solvent delivery system enters through one of side ports 346 where it is channelled by slot 350 to exit from another one of side ports 346. The exiting washing solvent then passes into one of the reservoirs and is pumped back into valve 326 through bottom port 348 where slot 352 channels the solvent out of another one of side ports 346. The washing solvent then circulates through the CAS stack and back into one of side ports 346 where slot 354 channels the fluid out of still another one of side ports 346 where it is wasted.

In FIG. 23C, valve 326 is in a gas dry position and corresponds to the position of valve 316 in FIG. 20D. In the gas dry position, a drying gas from the solvent delivery system enters valve 326 through one of side ports 346 where it is channelled by slot 354 to exit through another one of side ports 346. The drying gas then passes through the CAS stack and enters back into valve 326 through still another one of side ports 346. Slot 350 then channels the drying gas out through another one of side ports 346 where it is delivered to waste.

The invention has now been described in detail. All references cited above are hereby incorporated by reference. Further, it will be appreciated that various modifications and changes may be made without departing from the invention. Therefore, the scope and content of this invention are not limited by the foregoing description. Rather, the scope and content are to be defined by the following claims.

What is claimed is:

1. A system for synthesizing a combinatorial library of compounds, the system comprising:
   (X×Y×Z) reaction zones arranged in a free dimensional array having x, y and z axes and forming X (y,z), Y (x,z) and Z (x,y) reaction planes, such that there are a plurality of Z(x,y) reaction planes wherein
   (i) the location of each zone in the array is defined by its (x,y,z) coordinates,
   (ii) each of said zones comprises a solid support formed of a portion of a sheet of membrane disposed in a Z(x,y) reaction plane such that said portion of a sheet of membrane provides support for a plurality of (x,y) reaction zones,
   (iii) each sheet of membrane provides supports for a plurality of (x,y) reaction zones which have a common z coordinate and which are isolated from one another by fluid-tight seals, and
   (iv) reaction zones having common (x,y) coordinates are in fluid communication with one another;
   a reagent source,
   a transfer means connecting said reaction zones with said reagent source, and
   a delivery means for delivering fluid from said reagent source to said reaction zones by way of said transfer means.

2. A system as in claim 1, wherein each solid support has a first building block, derivatized thereto.

3. A system as in claim 1, further comprising a plurality of manifolds, each of which is selectively alignable with one of the (x,z) or (y,z) planes of reaction zones, to allow building blocks from a single reagent source to pass through a selected one of said planes of reaction zones.

4. A system as in claim 1, further comprising a pair of end plates in a (x,y) plane flanking the three dimensional array of reaction zones along the z axis, wherein the end plates each include plumbing to circulate the chemicals through each (x,z) array or each (y,z) array of reaction vessels.

5. A system as in claim 4, wherein
   the end plates are rotatable about a z axis relative to the reaction zones to align the plumbing with selected (x,z) or (y,z) planes of Z(x,y) reaction planes, and
   the plumbing comprises channels in the end plates to circulate the same building block through reaction zones having a common x coordinate value when the end plates are in a first orientation, and to circulate the same building block through zones having a common y coordinate value when the end plates are in a second orientation.

6. A system as in claim 1, wherein said delivery means comprises a pump, said reagent source comprises a reagent vessel, and said transfer means comprising tubing and manifolds.

7. A system as in claim 1, wherein said transfer means forms a closed loop to re-circulate reagent through the reaction zones.

8. A system as in claim 1, wherein said reagent source comprises a number of reagent vessels that is equal to the number of X or Y reaction planes, whichever is greater.

9. A method for preparing a combinatorial library of compounds, comprising:

(1) providing (X×Y×Z) reaction zones arranged in a three dimensional array having x, y and z axes and forming X(y,z), Y(x,z) and Z(x,y) reaction planes, such that there are a plurality of Z(x,y) reaction planes, where the location of each zone in the array is defined by its (x,y,z) coordinates in the array, each of said zones comprises a solid support formed of a portion of a sheet of membrane disposed in a Z(x,y) reaction plane such that said portion of a sheet of membrane provides support for a plurality of (x,y) reaction zones, each sheet of membrane provides support for a plurality of (x,y) reaction zones which are isolated from one another by fluid-tight seals, and each solid support has a first building block derivatized thereto;

(2) contacting a second building block with the support in each of the zones such that supports in all zones having a common x coordinate value are contacted with the same second building block, under conditions effective to form an intermediate product; and (3) contacting a third building block with the support in each of the zones such that supports in all zones having a common y coordinate value are contacted with the same third building block, under conditions effective to form a plurality of different compounds in different reaction zones;

wherein said different compounds in different reactions zones together form said combinatorial library of compounds.

10. The method of claim 9, wherein all zones having a common z coordinate value contain supports with the same first building block.

11. The method of claim 9, utilizing X different second building blocks and Y different third building blocks, where X is defined as the number of reaction planes having different x coordinate values and Y is defined as the number of reaction planes having different y coordinate values and wherein:

supports in all zones having a particular x coordinate value are contacted with a second building block that is different from the second building block contacted with supports in zones having a different x coordinate value; and supports in all zones having a particular y coordinate value are contacted with a third building block that is different from the third building block contacted with supports in zones having a different y coordinate value.

12. The method of claim 11, wherein the X different second building blocks are stored in X different reagent vessels, respectively, and are introduced to the zones through X different manifolds operably connected to said X reagent vessels, respectively; and the Y different third building blocks are stored in Y different reagents vessels, respectively, and are introduced to the zones through Y different manifolds operably connected to said Y reagent vessels, respectively.

13. The method of claim 9, wherein the second and third building blocks are introduced to the zones through an array of manifolds, and wherein each manifold of said array is:

(i) aligned with zones having a common x coordinate value when in a first orientation; and (ii) aligned with zones having a common y coordinate value when in a second orientation.

14. The method of claim 13, further comprising rotating the array of manifolds relative to the reaction zones to move the array of manifolds from the first orientation to the second orientation.

15. The method of claim 1, wherein the contacting steps comprise flowing the building blocks through one or more (x,y) reaction zones, and the three dimensional array of reaction zones is flanked along the z axis by a pair of end plates, each in an (x,y) plane and each of which includes plumbing to flow the building blocks through the reaction zones.

16. The method of claim 15, wherein the plumbing comprises channels in the plates effective to (i) circulate the same first building block through each zone having a common x coordinate value when the end plates are in a first orientation, and (ii) circulate the same second building block through each zone having a common y coordinate value when the end plates are in a second orientation.

17. The method of claim 16, wherein each of said reaction zones formed on said portion of a sheet of membrane further comprises a hole in said sheet of membrane to facilitate circulation of building blocks.

18. The method of claim 9, wherein the membrane is selected from the group consisting of polypropylene membrane, polyethylene membrane, polytetrafluoroethylene (PTFE) polyacrylate terpolymer membrane, PTFE polyacrylamide terpolymer membrane, and fluoropolymer membrane grafted with styrene, acrylate, or acrylamide.

19. The method of claim 18, wherein said membrane is a polyacrylate terpolymer or polyvinlylidine difluoride membrane.

20. The method of claim 9, wherein the supports for zones having a common z coordinate value are all on a sheet of membrane.

21. The method of claim 9, wherein supports for zones having different z coordinate values are isolated from one another and from the end plates by middle plates, each of said middle plates having an array of holes corresponding to the (x,y) reaction zones.

22. The method of claim 21, where the fluid-tight seal is achieved by applying pressure to the end plates, thereby compressing the membrane between the middle plates, wherein said reaction zones are defined by the portions of membrane aligned with the holes of the middle plate.

23. The method of claim 9, wherein the supports for zones having a common z coordinate value are on a plurality of sheets of membrane.

* * * * *